United States Patent
Shanley, IV et al.

(10) Patent No.: US 10,893,696 B2
(45) Date of Patent: Jan. 19, 2021

(54) SYSTEM AND METHOD FOR PROCESSING AGRICULTURAL PRODUCTS

(71) Applicant: Phase 3 Projects, LLC, Emerald Hills, CA (US)

(72) Inventors: John Francis Shanley, IV, Urbana, IL (US); Conor Edward Shanley, Emerald Hills, CA (US)

(73) Assignee: Phase 3 Projects, LLC, Emerald Hills, CA (US)

( * ) Notice: Subject to any disclaimer, the term of this patent is extended or adjusted under 35 U.S.C. 154(b) by 171 days.

(21) Appl. No.: 16/007,862

(22) Filed: Jun. 13, 2018

(65) Prior Publication Data

US 2018/0360096 A1    Dec. 20, 2018

Related U.S. Application Data

(60) Provisional application No. 62/519,684, filed on Jun. 14, 2017.

(51) Int. Cl.
*A23N 5/00* (2006.01)
*A23N 7/00* (2006.01)
*A23N 7/10* (2006.01)

(52) U.S. Cl.
CPC .............. *A23N 7/00* (2013.01); *A23N 5/002* (2013.01); *A23N 7/10* (2013.01); *A23N 5/00* (2013.01)

(58) Field of Classification Search
CPC ............. A23N 5/00; A23N 5/002; A23N 7/10
USPC ......... 99/575, 576, 585, 590, 593, 607, 608, 99/617, 628, 629, 630
See application file for complete search history.

(56) References Cited

U.S. PATENT DOCUMENTS

| 268,691 A | * 12/1882 | Klauder | A47J 43/26 |
| | | | 99/575 |
| 994,591 A | * 6/1911 | Jacobs | A23N 5/00 |
| | | | 241/240 |
| 2,444,203 A | 6/1948 | McKinnis | |

(Continued)

FOREIGN PATENT DOCUMENTS

| FR | 2641677 | 7/1990 |
| JP | 20130788288 | 5/2013 |

(Continued)

OTHER PUBLICATIONS

PCT International Search Report and Written Opinion for PCT/US2018/037415, Phase 3 Projects, LLC., dated Sep. 10, 2018.

*Primary Examiner* — Reginald Alexander
(74) *Attorney, Agent, or Firm* — Vista IP Law Group, LLP

(57) ABSTRACT

A system for processing agricultural items includes a first member having a first surface, a first axis, and a partially cylindrical space, the first surface being an inner surface of the partially cylindrical space. The system also includes a substantially arcuate second member having a second surface and a second axis, the second member being disposed at least partially in the partially cylindrical space, and the contoured second surface being an outer surface of the second member. The first surface and the second surface are substantially opposed to each other. One of the first and second surfaces substantially tapers toward another of the first and second surfaces along the first or second axes. The first and second axes are respective first and second circumferential axes.

12 Claims, 28 Drawing Sheets

(56) References Cited

U.S. PATENT DOCUMENTS

| | | | | |
|---|---|---|---|---|
| 3,628,582 A * | 12/1971 | Satake | ............... | B02B 3/08 |
| | | | | 99/617 |
| 4,526,092 A * | 7/1985 | Greenblatt | ............ | A47J 43/26 |
| | | | | 99/575 |
| 4,819,331 A * | 4/1989 | Joyama | ................ | A23N 5/00 |
| | | | | 241/240 |
| 4,829,893 A * | 5/1989 | Satake | ............... | B02B 3/00 |
| | | | | 99/519 |
| 5,461,970 A * | 10/1995 | Edwards, Jr. | ......... | A23N 5/00 |
| | | | | 99/574 |
| 7,789,016 B2 | 9/2010 | Alvarez | | |

FOREIGN PATENT DOCUMENTS

| | | |
|---|---|---|
| KR | 101680986 | 11/2016 |
| WO | WO0241704 | 5/2002 |
| WO | WO2007022175 | 2/2007 |

\* cited by examiner

SYSTEM AND METHOD FOR PROCESSING AGRICULTURAL PRODUCTS

CROSS REFERENCE TO RELATED APPLICATIONS

The present application claims priority to (1) U.S. Provisional Patent Application Ser. No. 62/519,684, filed on Jun. 14, 2017 entitled "SYSTEM AND METHOD FOR PROCESSING AGRICULTURAL PRODUCTS," the contents of which are fully incorporated herein by reference as though set forth in full.

FIELD OF THE INVENTION

The disclosed embodiments generally relate to agricultural products. In particular, the embodiments relate to produce (i.e., fruit and vegetable) processing systems, devices, and processes for extracting edible portions thereof. More particularly, the embodiments relate to systems and methods for extracting delicate edible vesicles from rinds with minimal damage to the vesicles.

BACKGROUND

Hundreds of millions of tons of fruits and vegetables are produced for human consumption each year. A portion are simply harvested and sent directly to consumer markets with little additional processing. A large portion undergoes further processing before going to market. These processes may include trimming, cleaning, cooking and packaging, among many others. Some secondary processes involve the extraction/separation of edible portions from inedible portions such as husks, stalks, rinds and shells. Peas, soybeans, oranges and peanuts are examples of produce that may undergo extraction before being delivered to the consumer/end user. Manual methods for extraction are known, but are almost always impractical for industrial scale production. Automated mechanical extraction processes have been developed for most commercially important products.

In recent years, a significant demand has developed for more exotic and unusual produce that are novel to large Western markets. One example is the Australian Finger Lime (*Citrus australasica*) native to the subtropical rainforest of southeast Australia. The finger lime has recently been imported into and cultivated in the United States, and has become a popular boutique garnish and/or recipe addition. The fresh vesicles extracted from the finger lime (sometimes called "lime caviar") contain a juice that is acidic and similar in flavor to that of a lime. The extracted vesicles produce the effect of a burst of effervescent tangy flavor as they are chewed. This effect depends on the preservation of the spherical vesicle membrane during the extraction, cleaning and packaging processes.

The delicacy/fragility of the vesicle membranes together with the toughness of the external rind and the resistance to motion of the fruit pulp has effectively restricted the vesicle extraction process to manual (i.e., by hand) methods thus far. Manual methods are slow and tedious, and cause prohibitive physical discomfort in workers when practiced over a period of time. Further, the extraction process requires a uniform and well controlled application of squeezing force to avoid excessive damage to the extracted vesicles. The human hand has proven unable achieve these requirements on a consistent basis, which precludes manual extraction methods for large volume production.

There is a need for automated, mechanical extraction systems for agricultural products having delicate end products, which address the shortcomings of currently-available methods.

SUMMARY

Embodiments are directed to systems and methods for processing agricultural products, i.e., fruits and vegetables. In particular, the embodiments are directed to systems and methods for extracting vesicles from agricultural products while minimizing damage thereto.

In one embodiment, a method of extracting fruit vesicles includes providing a pair of reciprocating parallel surfaces, a first of which is planar and a second of which is contoured to provide a progressive differential compression along the axis of a fruit which is engaged in a rolling motion between the surfaces. In other embodiments, the first and second surfaces are both contoured to achieve a progressive, differential compression therebetween. The second surface is contoured to first impart a small compression to the endmost portion of the fruit—the portion closest to the open surface of a severed end of the fruit—thus first mobilizing the endmost volume of fruit vesicles. The method also includes following the first small compression progressively with another compression to an adjacent portion of the fruit mobilizing those vesicles. This progression of compression is continued until vesicles along the entire length of the fruit have been mobilized. The direction of the progression of small compression can then be reversed with the surface contoured to complete the compression of the fruit beginning at the end most distant from the open end and ending at the open end. This reverse progression of the compression pushes the entire column of now mobilized fruit vesicles toward the open end of the fruit, and progressively compressing toward the open end until the entire column of vesicles has been extracted from the fruit. The rate of compression of the contoured surfaces as a function of the number of rotations of the fruit may be optimized to obtain the best combination of process speed and product quality.

In one or more embodiments, a fruit extraction system that functions similar to the method described above includes a planar first compression surface and a contoured second compression surface in a cylindrical configuration. In other embodiments, the first and second surfaces are both contoured to achieve a progressive, differential compression therebetween. One of the first and second surfaces forms an inner cylinder that rotates within an outer cylinder formed by the other surface. Such a system can operate in a continuously rotating fashion instead of a reciprocating fashion.

In one or more embodiments, a fruit extraction system (e.g., linear and/or circular compression system) has a progressively contoured compression surface that is symmetrical with respect to a plane which bisects the axis of the fruit to extract fruit vesicles from both ends of the fruit. The system may include two identical contours to simultaneously provide the initial compression from the two outer edges of the fruit, followed by progressive compression of adjacent sections until the contours meet at approximately the mid-section/midline of the fruit. The contours may also reverse direction to compress the fruit commencing at approximately the mid-section/midline and progressing outward to complete extraction of the pulp from both (open) ends of the fruit.

In one embodiment, a system for processing agricultural items includes a first member having a first surface and a first axis. The system also includes a second member having a contoured second surface and a second axis. The first and second members are configured such that the first surface and the contoured second surface are substantially opposed to each other. The contoured second surface includes a first higher portion that is closer to the first surface at a first orthogonal plane along the second axis compared to other portions of the contoured second surface in the first orthogonal plane. The contoured second surface also includes a second higher portion that is closer to the first surface at a second orthogonal plane along the second axis compared to other portions of the contoured second surface in the second orthogonal plane. The first and second higher portions are displaced from each other along an orthogonal axis perpendicular to the second axis.

In one or more embodiments, the contoured second surface substantially tapers toward the first surface along the second axis. The first and second higher portions may have different sizes. The first member may be an elongate member and the first axis may be a first longitudinal axis. The second member may be an elongate member and the second axis may be a second longitudinal axis substantially parallel to the first longitudinal axis. The first surface may be planar and/or flat. In other embodiments, the first and second surfaces are both contoured to achieve a progressive, differential compression therebetween.

In one or more embodiments, the first surface is substantially uniform. The first surface may be substantially smooth. The first surface may include a plurality of uniform teeth aligned along the axis.

In one or more embodiments, the first member includes a partially cylindrical space, and the first surface is an inner surface of the partially cylindrical space. The second member may be substantially arcuate and disposed at least partially in the partially cylindrical space. The contoured second surface may be an outer surface of the second member. The first and second axes may be respective first and second circumferential axes. The first member may be removably coupled to the system. The second member may be removably coupled to the system.

In one or more embodiments, the contoured second surface is substantially symmetrical along the second axis. The contoured second surface may include a pair of higher portions that converge toward each other along the second axis. The contoured second surface may include a higher portion that first transitions from a first side of the contoured second surface to an opposite second side of the contoured second surface along the second axis, then transitions from the second side of the contoured second surface to the first side of the contoured second surface along the second axis.

In one or more embodiments, the contoured second surface includes a plurality of stacked, contoured, parallel compression flanges. A first contoured, parallel compression flange may be configured to compress a first portion of an agricultural item. A second contoured, parallel compression flange may be configured to compress a second portion of the agricultural item adjacent the first portion. The plurality of stacked, contoured, parallel compression flanges may include a first symmetrical pair of contoured, parallel compression flanges configured to compress first and second portions of an agricultural item, and a second symmetrical pair of contoured, parallel compression flanges configured to compress third and fourth portions of the agricultural item respectively adjacent the first and second portions.

In one or more embodiments, the system also includes a motor operatively coupled to at least one of the first and second members to move the one of the first and second members relative to the other.

In another embodiment, a method of processing agricultural items includes generating an opening in an agricultural item. The method also includes placing the agricultural item between a first member having a first surface and a first axis, and a second member having a contoured second surface and a second axis. The first and second members are configured such that the first surface and the contoured second surface are substantially opposed to each other. The contoured second surface includes a first higher portion that is closer to the first surface at a first orthogonal plane along the second axis compared to other portions of the contoured second surface in the first orthogonal plane, and a second higher portion that is closer to the first surface at a second orthogonal plane along the second axis compared to other portions of the contoured second surface in the second orthogonal plane. The first and second higher portions are displaced from each other along an orthogonal axis perpendicular to the second axis. The contoured second surface substantially tapers toward the first surface along the second axis. The method further includes moving one of the first or second members relative to another of the first or second members, to roll the agricultural item between the first and second members, thereby applying a compressive force to the agricultural item.

In one or more embodiments, moving one of the first or second members relative to another of the first or second members also moves the agricultural item between a first side of the contoured second surface to an opposite second side of the contoured second surface, then from the second side of the contoured second surface to the first side of the contoured second surface. Applying the compressive force to the agricultural item may include applying the compressive force progressively from a first side of the agricultural item to an opposite second side of the agricultural item, then applying the compressive force progressively from the second side of the agricultural item to the first side of the agricultural item. The first side of the agricultural item may include the opening therein. The contoured second surface may include a higher portion that first transitions from a first side of the contoured second surface to an opposite second side of the contoured second surface along the second axis, then transitions from the second side of the contoured second surface to the first side of the contoured second surface along the second axis.

In one or more embodiments, the contoured second surface includes a plurality of stacked, contoured, parallel compression flanges. A first contoured, parallel compression flange may be configured to compress a first portion of an agricultural item. A second contoured, parallel compression flange may be configured to compress a second portion of the agricultural item adjacent the first portion.

In one or more embodiments, applying the compressive force to the agricultural item includes applying a first compressive force progressively from a first side of the agricultural item to an opposite second side of the agricultural item, while simultaneously applying a second compressive force progressively from the second side of the agricultural item to the first side of the agricultural item. Applying the compressive force to the agricultural item also includes applying the first compressive force progressively from the second side of the agricultural item to the first side of the agricultural item, while simultaneously applying the second compressive force progressively from the first side of the agricultural item to the second side of the agricultural item. The contoured second surface may be substantially symmetrical along the second axis. The contoured second surface may include a pair of higher portions that converge toward each other along the second axis. The contoured second surface may include a plurality of stacked, contoured, parallel compression flanges. The plurality of stacked, contoured, parallel compression flanges may include a first symmetrical pair of contoured, parallel compression flanges configured to compress first and second portions of an agricultural item, and a second symmetrical pair of contoured, parallel compression flanges configured to compress third and fourth portions of the agricultural item respectively adjacent the first and second portions.

In one or more embodiments, the first and second higher portions have different sizes. The first member may be an elongate member and the first axis may be a first longitudinal axis. The second member may be an elongate member and the second axis may be a second longitudinal axis substantially parallel to the first longitudinal axis. The first surface is planar and/or flat. In other embodiments, the first and second surfaces are both contoured to achieve a progressive, differential compression therebetween. Moving one of the first or second members relative to another of the first or second members may include reciprocating the one of the first or second members relative to the another of the first or second members.

In one or more embodiments, the first surface is substantially uniform. The first surface may be substantially smooth. The first surface may include a plurality of uniform teeth aligned along the axis. The first member may include a partially cylindrical space, and the first surface may be an inner surface of the partially cylindrical space. The second member may be substantially arcuate and disposed at least partially in the partially cylindrical space, and the contoured second surface may be an outer surface of the second member.

In one or more embodiments, the first and second axes are respective first and second circumferential axes. Moving one of the first or second members relative to another of the first or second members may include rotating the one of the first or second members relative to the another of the first or second members. Rotating the one of the first or second members relative to the another of the first or second members may include rotating the one of the first or second members relative to the another of the first or second members in only one direction.

In one or more embodiments, moving one of the first or second members relative to another of the first or second members reduces a distance between respective first and second portions of the first and second members adjacent the agricultural item. Moving one of the first or second members relative to another of the first or second members may change an intensity of the compressive force. Moving one of the first or second members relative to another of the first or second members may change a location of the compressive force along the orthogonal axis, such that the compressive force may be a progressive differential compressive force.

In one or more embodiments, the agricultural item may be a citrus fruit. Applying the compressive force to the agricultural item may release a vesicle from a locule without bursting the vesicle.

In still another embodiment, a system for processing agricultural items includes a first member having a first surface, a first axis, and a cylindrical space, the first surface being an inner surface of the cylindrical space. The system also includes a substantially arcuate second member having a second surface and a second axis, the second member being disposed at least partially in the cylindrical space, and the contoured second surface being an outer surface of the second member. The first surface and the second surface are substantially opposed to each other. One of the first and second surfaces substantially tapers toward another of the first and second surfaces along the first or second axes. The first and second axes are respective first and second circumferential axes.

In one or more embodiments, the second surface includes first and second portions that change height relative to each other along at least a portion of the second axis. The first surface may include a plurality of teeth along at least a portion of the first axis. The plurality of teeth may be uniform. The second surface may be substantially symmetrical along the second axis. The first surface may be substantially symmetrical along the first axis.

In one or more embodiments, the system also includes a motor operatively coupled to at least one of the first and second members to move the one of the first and second members relative to the other. The system may also include a feeder to introduce an agricultural item into a receiving notch in the second member. The system may also include an ejector for removing a processed agricultural item from the system.

In one or more embodiments, the contoured second surface includes a plurality of stacked, contoured, parallel compression flanges. A first contoured, parallel compression flange may be configured to compress a first portion of an agricultural item. A second contoured, parallel compression flange may be configured to compress a second portion of the agricultural item adjacent the first portion. The plurality of stacked, contoured, parallel compression flanges may include a first symmetrical pair of contoured, parallel compression flanges configured to compress first and second portions of an agricultural item, and a second symmetrical pair of contoured, parallel compression flanges configured to compress third and fourth portions of the agricultural item respectively adjacent the first and second portions.

In yet another embodiments, a method of processing agricultural items includes generating an opening in an agricultural item. The method also includes placing the agricultural item between a first member having a first surface, a first axis, and an cylindrical space, the first surface being an inner surface of the cylindrical space, and a substantially arcuate second member having a second surface and a second axis, the second member being disposed at least partially in the cylindrical space, and the contoured second surface being an outer surface of the second member. The first surface and the second surface are substantially opposed to each other. One of the first and second surfaces substantially tapers toward another of the first and second surfaces along the first or second axes. The first and second axes are respective first and second circumferential axes. The method further includes rotating one of the first or second members relative to another of the first or second members, to roll the agricultural item between the first and second members, thereby applying a compressive force to the agricultural item.

In one or more embodiments, applying the compressive force to the agricultural item includes first applying the compressive force to a first side of the agricultural item, then applying the compressive force to a middle of the agricultural item. The first side of the agricultural item may include the opening therein. The second surface may include first and second portions that change height relative to each other along at least a portion of the second axis. The first surface may include a plurality of teeth along at least a portion of the first axis. The plurality of teeth may be uniform. The second surface may be substantially symmetrical along the second axis. The first surface may be substantially symmetrical along the first axis. T In one or more embodiments, the method also includes cutting agricultural items to a length substantially equal to a dimension of the first member orthogonal to the first axis. The method may also include cutting agricultural items to a length substantially equal to a dimension of the second member orthogonal to the second axis. The agricultural item may be a citrus fruit. Applying the compressive force to the agricultural item may release a vesicle from a locule without bursting the vesicle.

In one or more embodiments, the contoured second surface includes a plurality of stacked, contoured, parallel compression flanges. A first contoured, parallel compression flange may be configured to compress a first portion of an agricultural item. A second contoured, parallel compression flange may be configured to compress a second portion of the agricultural item adjacent the first portion. The plurality of stacked, contoured, parallel compression flanges may include a first symmetrical pair of contoured, parallel compression flanges configured to compress first and second portions of an agricultural item, and a second symmetrical pair of contoured, parallel compression flanges configured to compress third and fourth portions of the agricultural item respectively adjacent the first and second portions.

The aforementioned and other embodiments of the invention are described in the Detailed Description which follows.

BRIEF DESCRIPTION OF THE DRAWINGS

The foregoing and other aspects of embodiments are described in further detail with reference to the accompanying drawings, in which the same elements in different figures are referred to by common reference numerals, wherein.

Figure 1A:
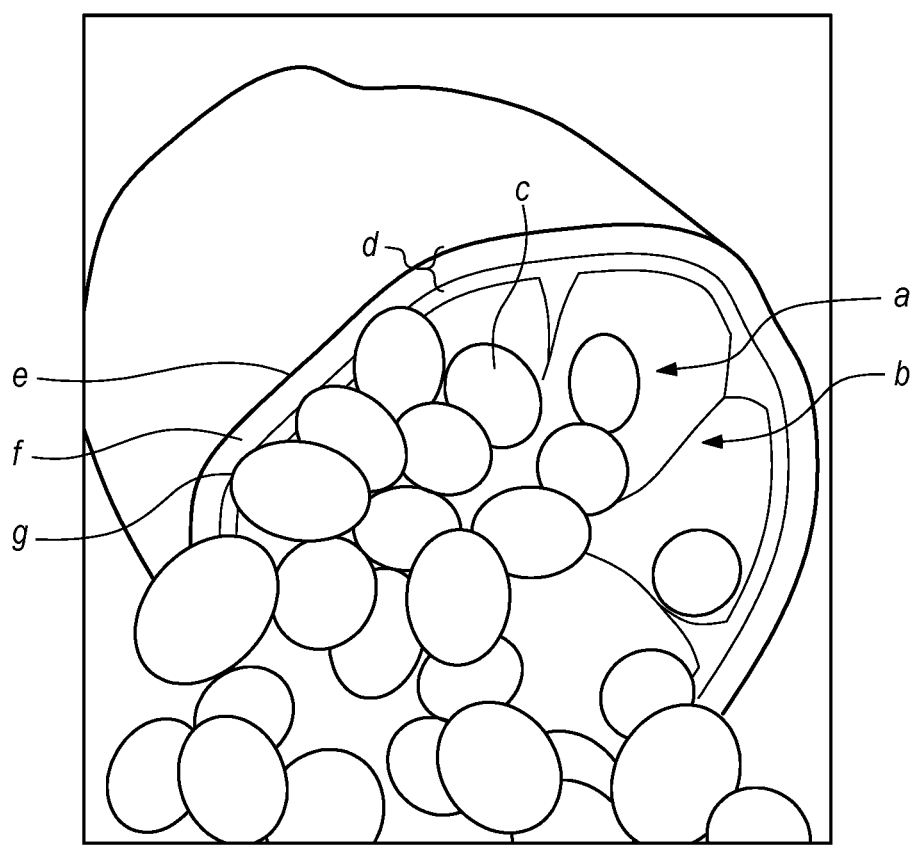
FIGS. 1A-1B illustrate various aspects of the fruit anatomy of the Australian Finger Lime (*Citrus australasica*).

In order to better appreciate how to obtain the above-recited and other advantages and objects of various embodiments, a more detailed description of embodiments is provided with reference to the accompanying drawings. It should be noted that the drawings are not drawn to scale and that elements of similar structures or functions are represented by like reference numerals throughout. It will be understood that these drawings depict only certain illustrated embodiments and are not therefore to be considered limiting of scope of embodiments.

DETAILED DESCRIPTION OF ILLUSTRATIVE EMBODIMENTS

Figure 1B:
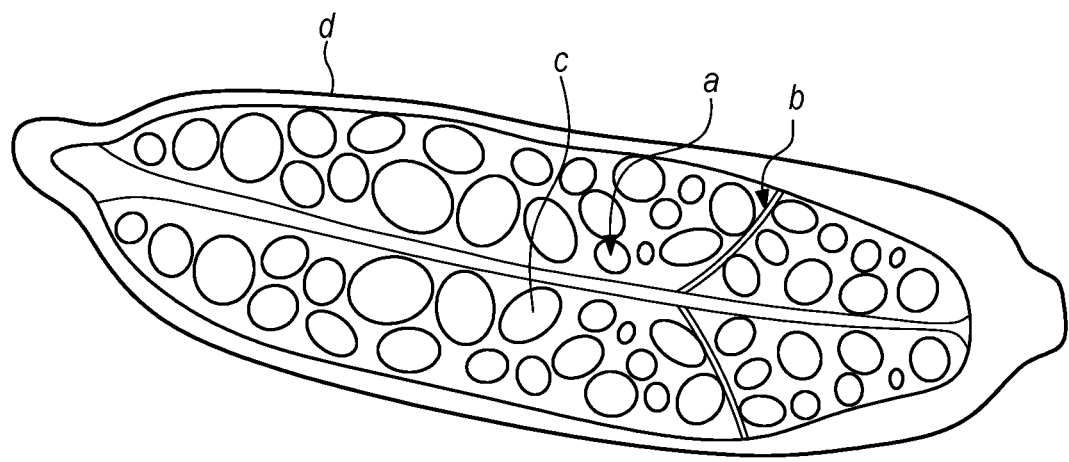

FIGS. 1A-1B illustrate various aspects of the fruit anatomy of the Australian Finger Lime (*Citrus australasica*). FIG. 1A depicts the elongated Lime with one end severed, exposing the inner morphology of the fruit. FIG. 1B shows a group of carpels (a) oriented vertically with their margins curved adaxially to join the floral axis thus forming locules (b). Locules are small cavities containing the juice vesicles (c) of the Finger Lime. Exterior to the locules is the pericarp (d) which is subdivided into three regions: the exocarp (flavedo or exterior peel) (e), mesocarp (albedo or interior peel) (f), and the endocarp (g) (locule membrane). Developmentally, juice vesicles (c) arise from multicellular primordial bulges on the locular side of the endocarp (g) surface, usually on the radial wall. Through cell division they differentiate into vesicles (c) consisting of a distinct stalk and a spherical terminal body which comprises a multicellular sac enclosed by a membrane, usually containing a small amount of juice.

Successful extraction of juice vesicles requires the rupture of the stalks that attach the spherical vesicles to the endocarp without damaging the outer membrane of the vesicles, thereby mobilizing the vesicles while maintaining their integrity. The force required to rupture a stalk is very small. A small squeezing force applied with the fingers combined with a rotational motion at the cut end of the fruit is typically sufficient to dislodge the endmost vesicles without damage to the outer membrane of the vesicle. A greater squeezing force is required when applied some distance away from the cut end of the fruit. This may be the result of the accumulation of the stalk rupture forces as the column of fruit to be displaced increases in length. At some critical distance from the cut end of the fruit the squeezing force required to dislodge the vesicles exceeds the burst strength of the vesicles' exterior membranes and the juice vesicles are crushed rather than mobilized and expelled. An indication of the quality of the extracted vesicle product is a low fraction of crushed vesicles and a resulting low concentration of free acidic liquid in the extract.

Extraction Systems with Continuously Contoured Compression Surface

In one embodiment, a method of extracting fruit vesicles includes providing a pair of reciprocating parallel surfaces, a first of which is planar and a second of which is contoured to provide a progressive differential compression along the axis of a fruit which is engaged in a rolling motion between the surfaces. In other embodiments (not shown), the first and second surfaces are both contoured to achieve a progressive, differential compression therebetween. The second surface is contoured to first impart a small compression to the endmost portion of the fruit—the portion closest to the open surface of a severed end of the fruit—thus first mobilizing the endmost volume of fruit vesicles. The method also includes following the first small compression progressively with another compression to an adjacent portion of the fruit mobilizing those vesicles. This progression of compression is continued until vesicles along the entire length of the fruit have been mobilized. The direction of the progression of small compression can then be reversed with the surface contoured to complete the compression of the fruit beginning at the end most distant from the open end and ending at the open end. This reverse progression of the compression pushes the entire column of now mobilized fruit vesicles toward the open end of the fruit, and progressively compressing toward the open end until the entire column of vesicles has been extracted from the fruit. The rate of compression of the contoured surfaces as a function of the number of rotations of the fruit may be optimized to obtain the best combination of process speed and product quality.

In one or more embodiments, a fruit extraction system that functions similar to the method described above includes a planar first compression surface and a contoured second compression surface in a cylindrical configuration. In other embodiments, the first and second surfaces are both contoured to achieve a progressive, differential compression therebetween. One of the first and second surfaces forms an inner cylinder that rotates within an outer cylinder formed by the other surface. Such a system can operate in a continuously rotating fashion instead of a reciprocating fashion.

In one or more embodiments, a fruit extraction system (e.g., linear and/or circular compression system) has a progressively contoured compression surface that is symmetrical with respect to a plane which bisects the axis of the fruit to extract fruit vesicles from both ends of the fruit. The system may include two identical contours to simultaneously provide the initial compression from the two outer edges of the fruit, followed by progressive compression of adjacent sections until the contours meet at approximately the mid-section/midline of the fruit. The contours may also reverse direction to compress the fruit commencing at approximately the mid-section/midline and progressing outward to complete extraction of the pulp from both (open) ends of the fruit.

The continuously contoured compression surfaces described above provide a more consistent, higher quality of product than manual (i.e., by hand) extraction methods.

Figure 2:
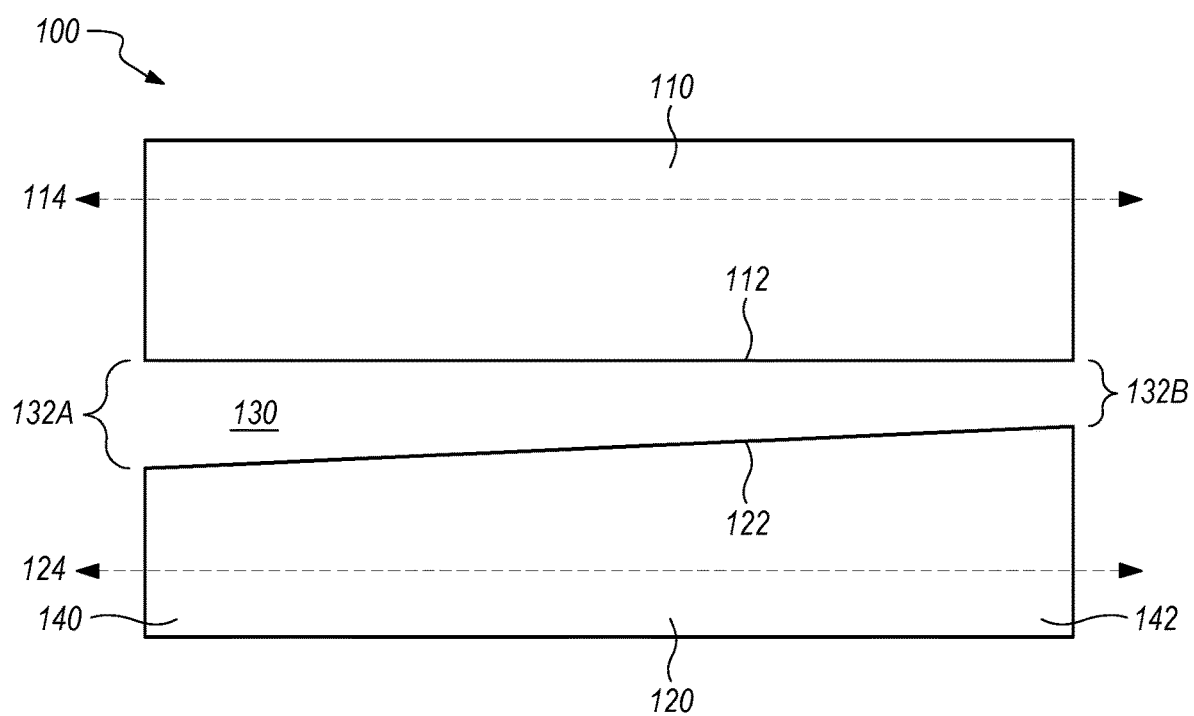
FIG. 2 illustrates a system for processing agricultural items according to one embodiment.

FIG. 2 depicts a first member 110 and a second member 120 of an extraction system 100 according to one embodiment in a longitudinal cross-sectional view. The first and second members 110, 120 may be the elongate bodies. The first member 110 has a first surface 112 and a first longitudinal axis 114, which is substantially uniform (e.g., planar or flat). The second member 120 has a second surface 122, which tapers toward the first surface 112 along a second longitudinal axis 124. The first and second longitudinal axes 114, 124 are substantially parallel to each other and a longitudinal axis of the extraction system 100. In other embodiments (not shown), the first and second surfaces are both contoured to achieve a progressive, differential compression therebetween.

The first and second members 110, 120 are disposed near each other such that first and second surfaces 112, 122 are substantially opposed to each other. In this configuration, the first and second members 110, 120 substantially surround and define an inter-member space 130. Because the second surface 122 tapers toward the first surface 112 along the second longitudinal axis 124, the inter-member space 130 has an inter-member distance 132 that decreases from a first end 140 to a second end 142 of the second member 120. The decrease in the inter-member distance 132 corresponds to the increase in the height of the second surface 122. Accordingly, if an agricultural item/product (not shown) is placed between the first and second members 110, 120 at the first end 140 of the second member 120 and moved toward the second end 142 of the second member 120, the decreasing inter-member distance 132 (from 132A to 132B) generates an increasing compressive force on the agricultural item/product. One method of moving an agricultural item/product from the first end 140 to the second end 142 of the second member 120 is to move the first and second members 110, 120 relative to each other along the respective first and second longitudinal axes 114, 124 to roll the agricultural item/product.

Figure 3A:
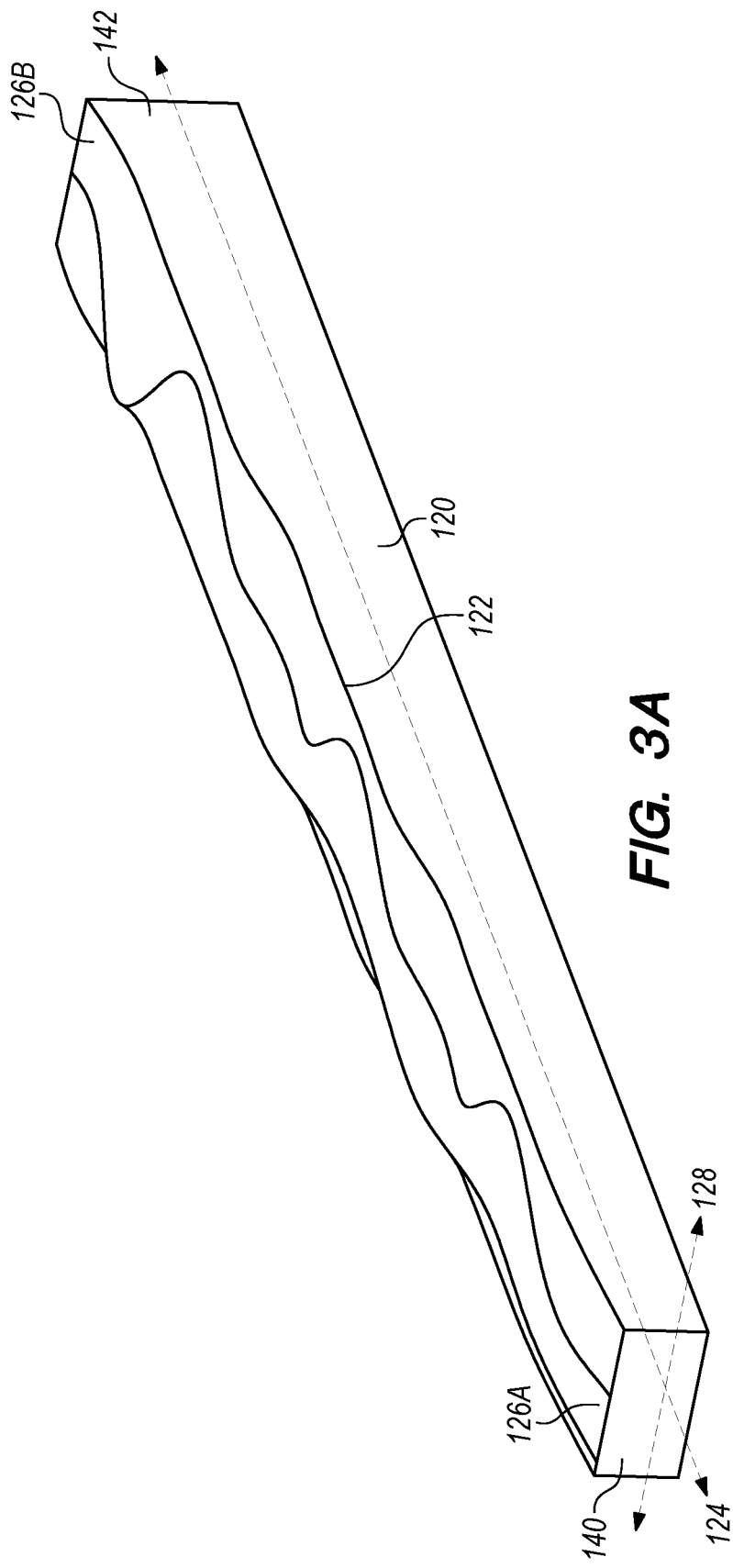
FIGS. 3A-3C illustrate a member of a system for processing agricultural items according to one embodiment. The member having a contoured surface.
Figure 3B:
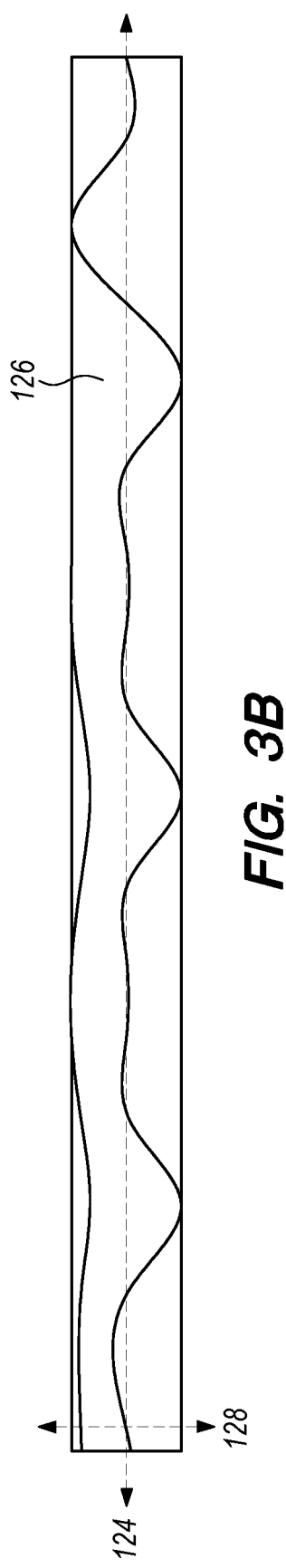
Figure 3C:
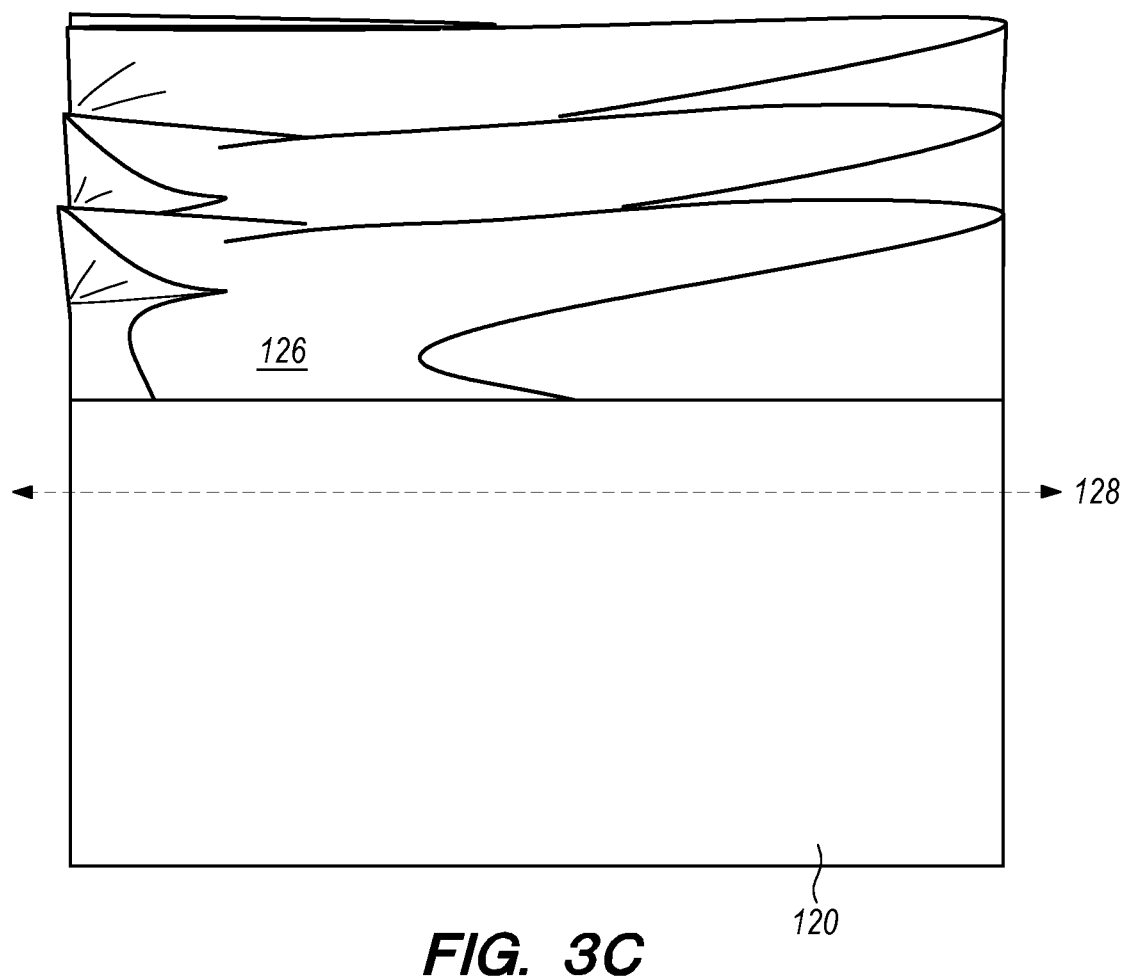
Figure 4:
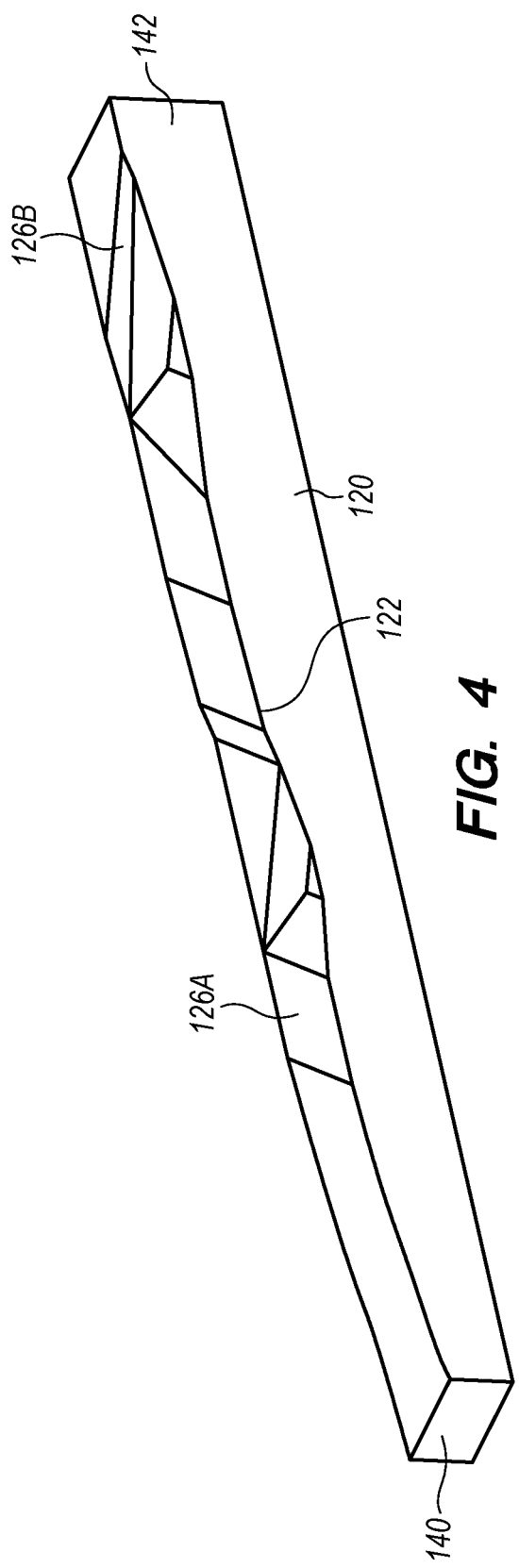
FIGS. 4-7BA illustrate members of systems for processing agricultural items according to various embodiments. The members having respective contoured surfaces.
Figure 5:
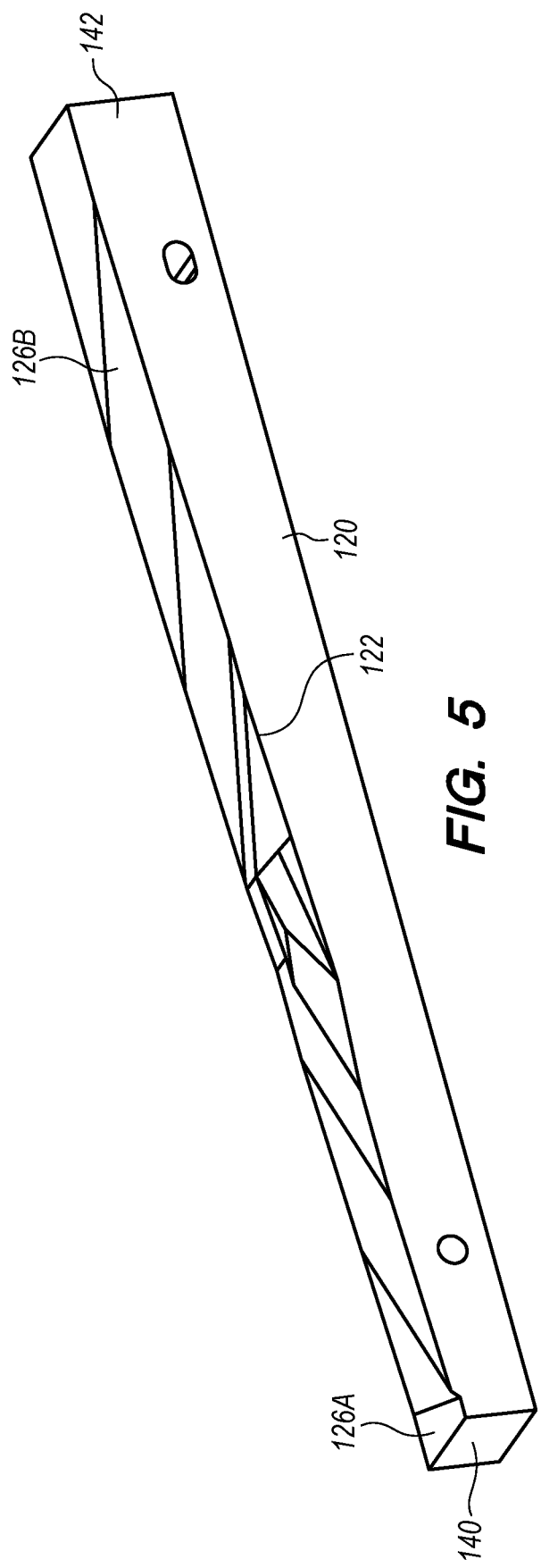
Figure 6:
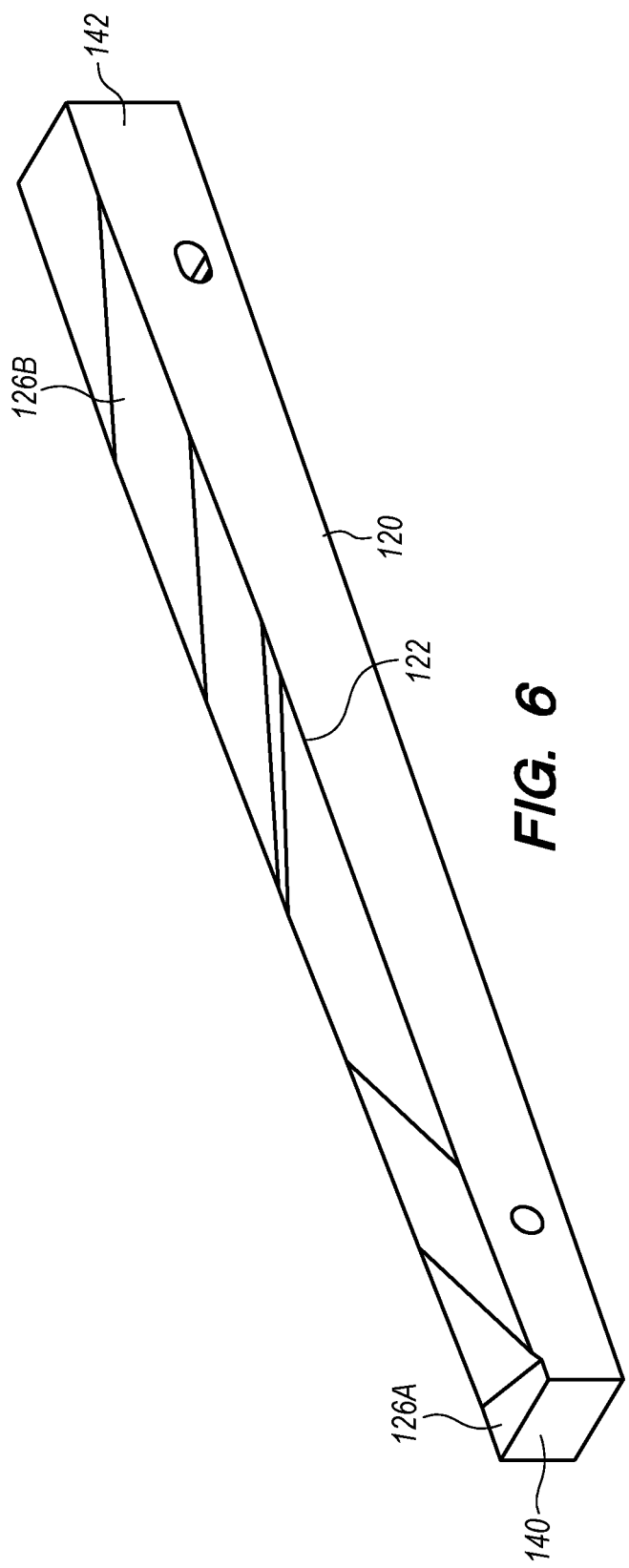

In addition to tapering from the first end 140 to the second end 142, the second surface 122 may also be contoured to apply a compression force to specific portion(s) of an agricultural item/product disposed between the first and second members 110, 120. For instance, FIG. 3A depicts a second member 120 according to another embodiment that is both tapered from the first end 140 to the second end 142 and contoured to direct a compression force to specific portion(s) of an agricultural item/product (not shown) in a perspective view. The second surface 122 of the second member 120 includes a raised/higher portion 126 that changes position along an orthogonal axis 128 that is perpendicular to the second longitudinal axis 124 as the raised/higher portion 126 extends along the second longitudinal axis 124. FIGS. 3B and 3C depict the same second member 120 depicted in FIG. 3A from a top view and an end view, respectively, to better illustrate the changes in position of the raised/higher portion 126 along the orthogonal axis 128 as the raised/higher portion 126 extends along the second longitudinal axis 124.

In the embodiment depicted in FIGS. 3A-3C, as an agricultural item/product (not shown) is moved from the first end 140 to the second end 142 of the second member 120, the agricultural item/product is not only compressed (as a result of the taper of the second surface 122), but also differentially compressed (as a result of the raised/higher portion 126 changing position along the orthogonal axis 128). Referring to FIG. 3A, an agricultural item/product may include an open end (i.e., cut) adjacent the raised/higher portion 126 at the first end 140 of the second member. For such an embodiment, as the agricultural item/product is rolled across the second surface 122, a compression force will be first applied to the open end, and then the compression force will move down the length of the agricultural item/product away from the open end toward an opposite end. Next, the compression force will move from the opposite end back toward the open end. This compression cycle will repeat from open end to opposite end at least three times as a result of the pattern of the raised/higher portion 126 in the second member 120 depicted in FIGS. 3A-3C, with each compression cycle increasing in force. This progressive differential compression releases vesicles from locules while minimizing bursting of vesicles.

Figure 7A:
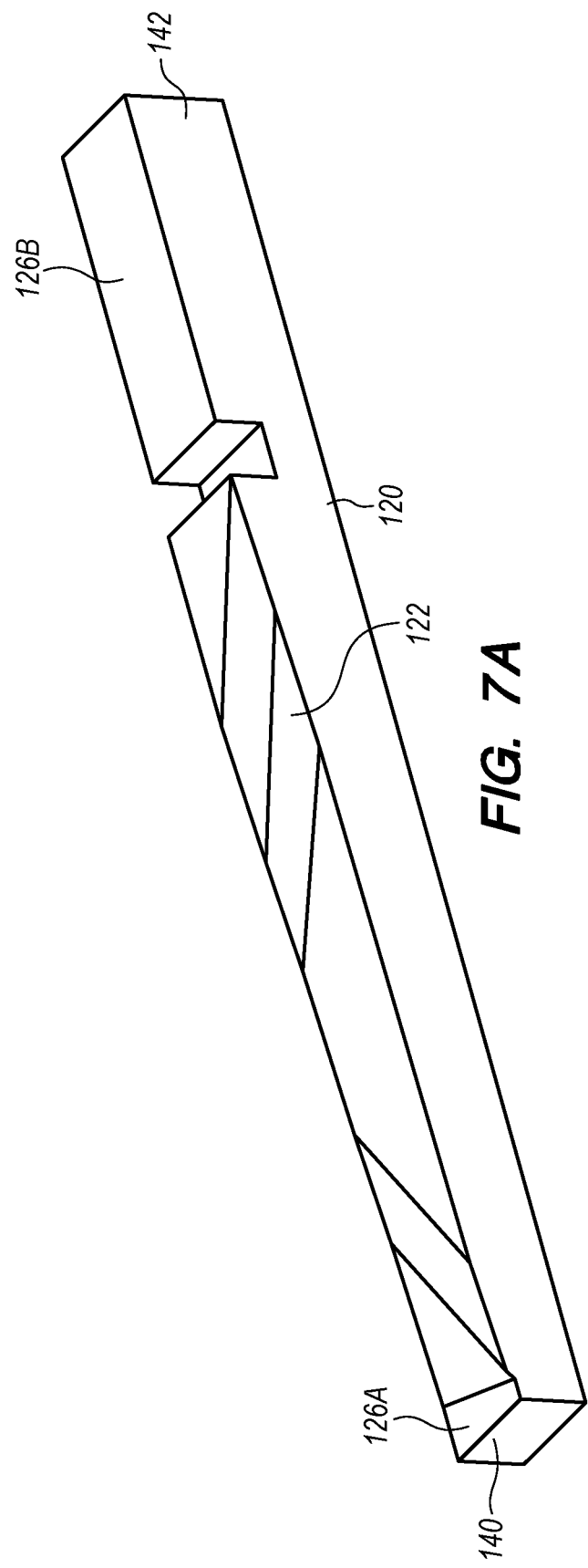
Figure 7B:
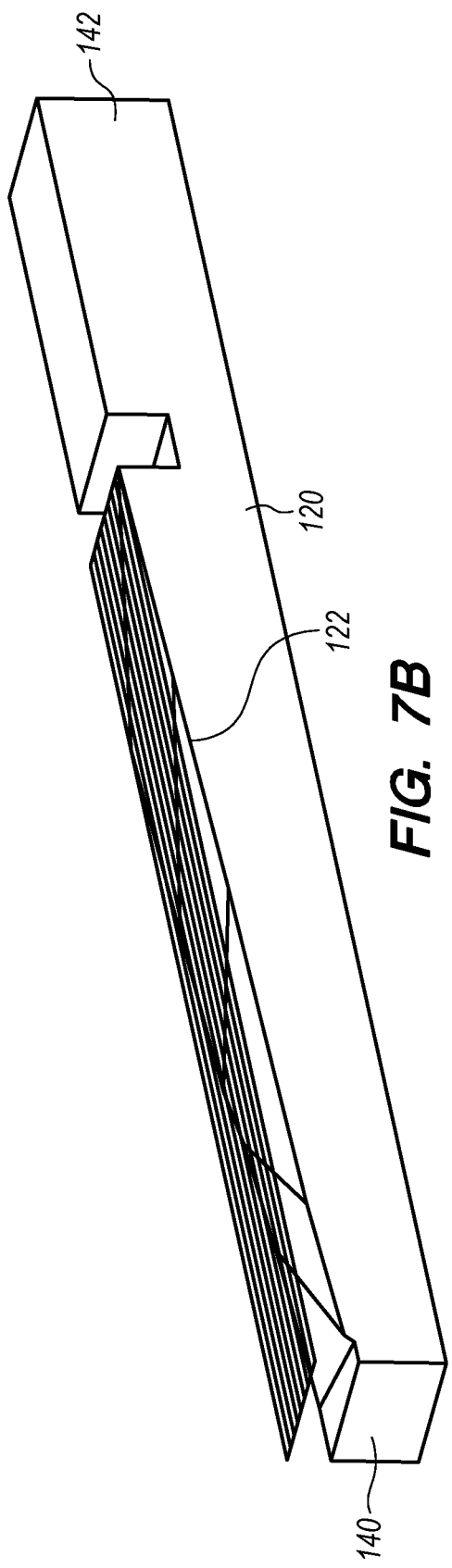

The pattern of the raised/higher portion 126 on the second surface 122 of the second member 120 can be changed to tune/modify/adjust the pattern of application of the compressive force as an agricultural item/product is moved from the first end 140 to the second end 142 of the second member 120. For instance, the embodiments depicted in FIGS. 4-7B in perspective view include various patterns of raised/higher portions 126 on the second surface 122 of the second number 120. FIG. 7B also includes a plane to demonstrate the taper of the second surface 122. As shown in FIGS. 4-7B, the raised/higher portion 126 can vary and a number of dimensions including, but not limited to, height, width, cross-sectional shape, continuity, etc.

In some embodiments (see below), the raised/higher portion 126 can take the form of teeth (e.g., parallel to the orthogonal axis) that grab the agricultural item/product inserted between the first and second members 110, 120.

In some embodiments (not shown), the raised/higher portion 126 can be tuned to first apply two compressive forces at two opposite end portions of the agricultural item/product, then to progress the compressive forces toward a mid-section/midline of the second member 120, then to progress the compressive forces back out toward the opposite end portions. The raised/higher portion 126 can be tuned to apply this in/out compression cyclically and at increasingly higher compressive forces.

The relative movements of the first and second members 110, 120 described herein can be reciprocated through a number of cycles to more completely release vesicles from locules. The number of cycles can be adjusted to maximize the number of release vesicles while minimizing the number of ruptured vesicles.

Cylindrical Extraction Systems with Contoured Compression Surface

The embodiments depicted in FIGS. 2-7B include two elongate bodies disposed near each other. In other embodiments, one of the first or second members may include a partially cylindrical space and the other of the first or second members may be substantially arcuate and disposed in the partially cylindrical space. These embodiments allow continuous motion of the first and second members relative to each other without reciprocation, facilitating automated, continuous, batch processing of agricultural items/products.

Figure 8A:
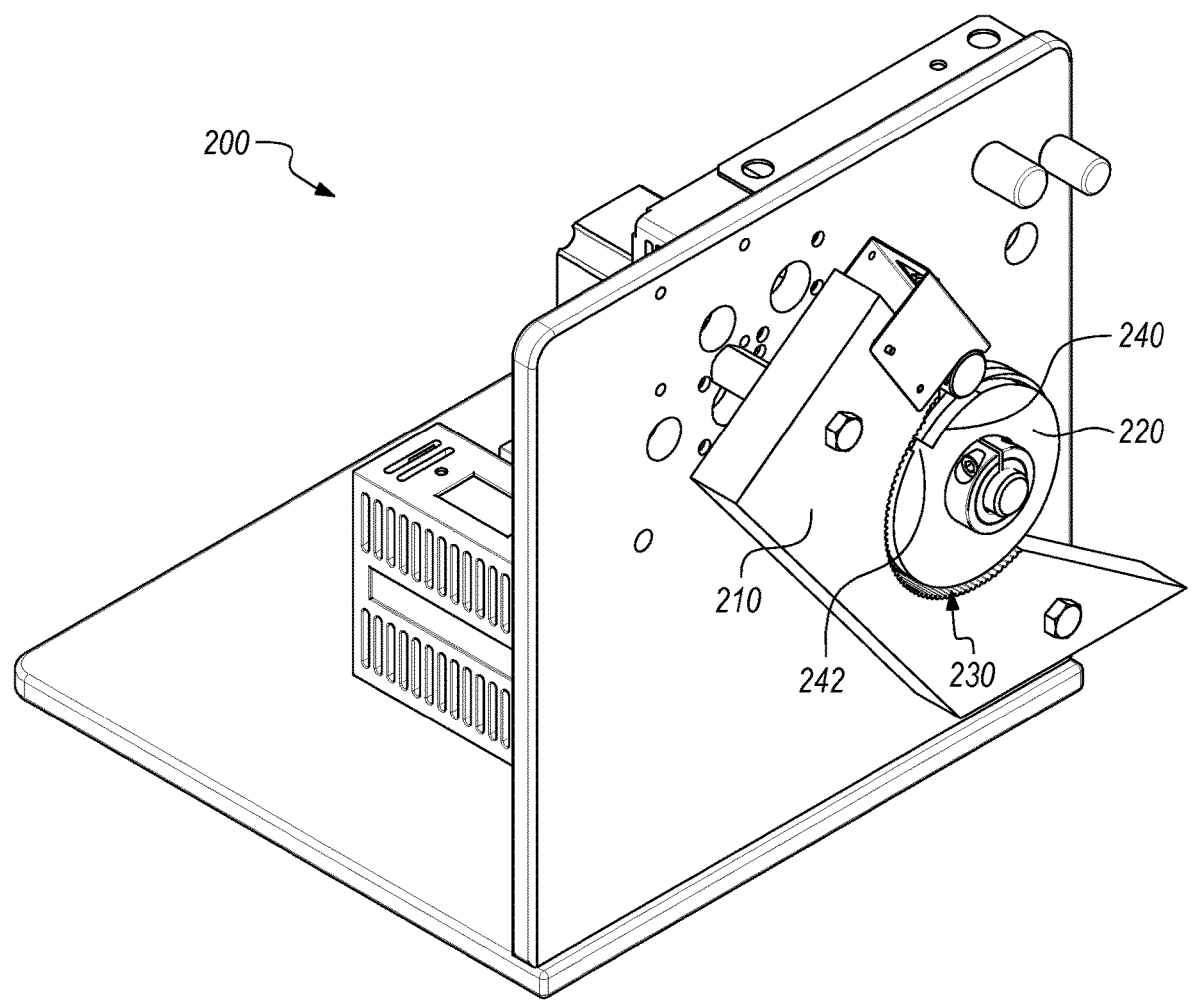
FIGS. 8A-8H illustrate a cylindrical extraction system for processing agricultural items according to one embodiment.
Figure 8B:
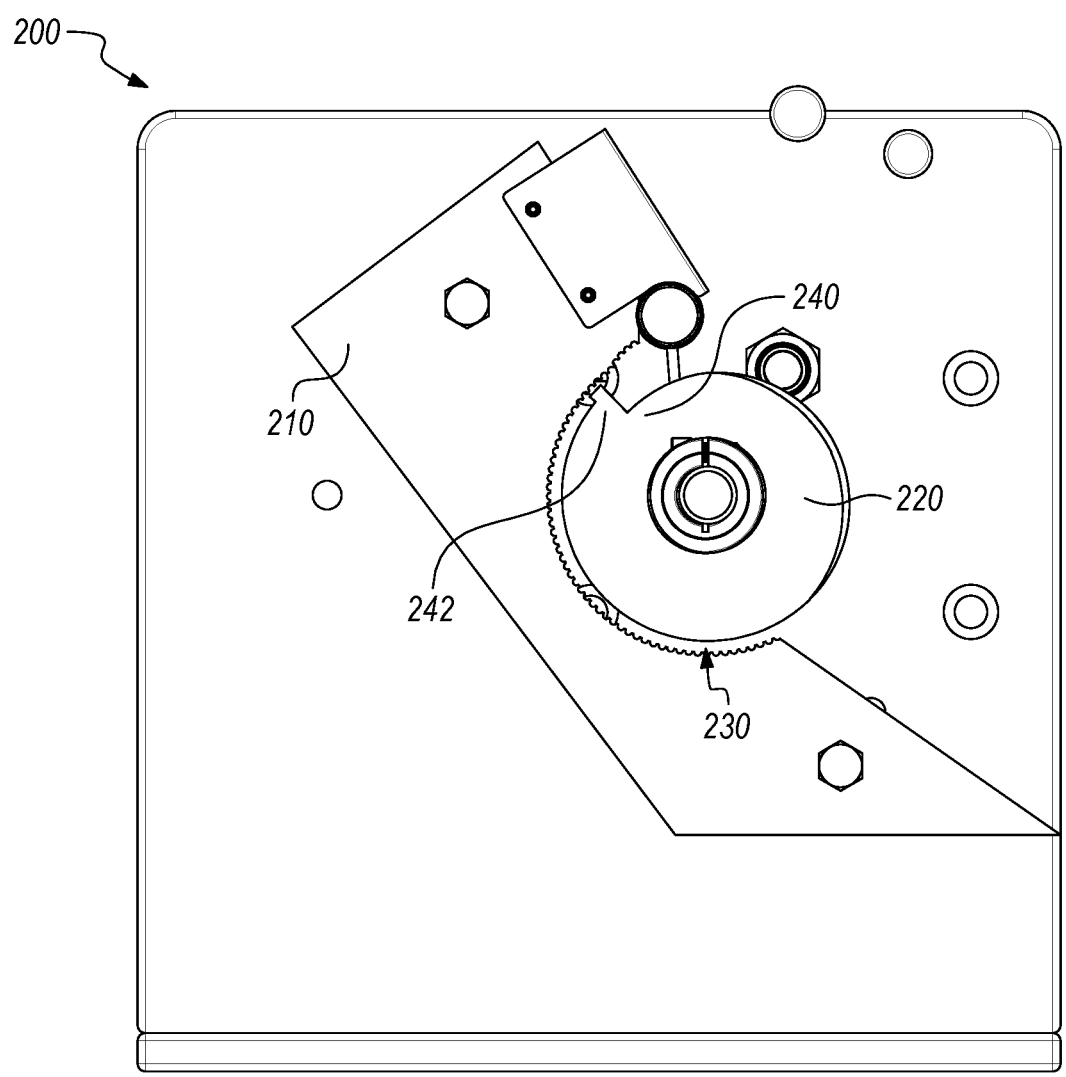
Figure 8C:
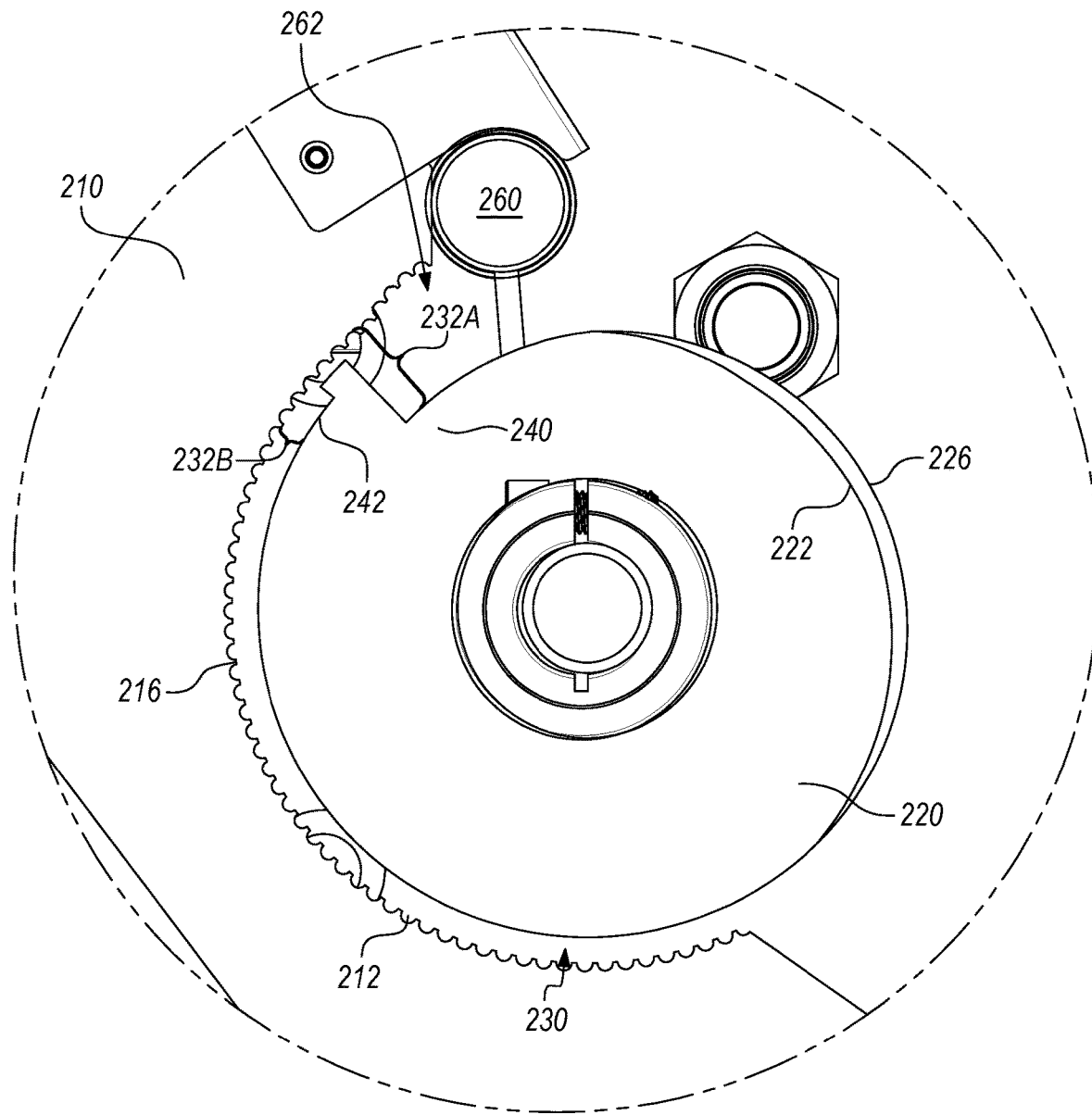

FIGS. 8A-8G depict a cylindrical extraction system 200 according to one embodiment. FIGS. 8A and 8B depict a cylindrical extraction system 200 including a first member ("stator") 210 having a partially cylindrical space 230 and a substantially arcuate second member ("rotor") 220 disposed in the partially cylindrical space 230 in perspective and side views. The rotor 220 is described as "substantially arcuate" because the outer surface 222 of the rotor 220 in cross-section does not describe a circle, but rather a shape similar to a circle. The outer surface 222 of the rotor 220 is formed by a plurality of stacked lamina 226A-226D, some of which have different cross-sectional geometries, as described below. The space 230 in the stator 210 is described as "partially cylindrical" because the inner surface 212 of the stator 210 in cross-section generally describes a portion of a circle. Because the rotor 220 is substantially arcuate, the first and second ends 240, 242 of the rotor 220 are adjacent to each other on the circumference of the substantially cylindrical rotor 220. The first and second axes (not shown) of the respective stator 210 and rotor 220 are circumferential axes.

FIGS. 8C-8G depict in greater detail the stator 210 and the rotor 220 of the cylindrical extraction system 200 depicted in FIGS. 8A and 8B. The stator 210 has a partially cylindrical space 230, and the substantially arcuate rotor 220 is disposed in the partially cylindrical space 230. The first member/stator 210 has a first/inner surface 212, which includes a plurality of teeth 216 to grab the agricultural item/product (not shown; see FIGS. 10B to 10G) as it progresses through the partially cylindrical space 230 (described below). The second member/rotor 220 has a second/outer surface 222, which tapers toward the first surface 212 along a circumferential second axis around the substantially arcuate rotor 220 while also changing cross-sectional geometry as described below. The stator 210 and the rotor 220 define a receiving notch 262 to receive an agricultural item/product into the system 200. The receiving notch 262 is enlarged as the inner surface 212 of the stator 210 invaginates from the circumference of the partially cylindrical space 230 adjacent the receiving notch 262. The enlarged receiving notch 262 facilitates loading of agricultural item/product and control of the position of the agricultural item/product by controlling the counter-clockwise rotation of the rotor 220 relative to the stator 210. The system 200 also includes a loading member 260, which is a hollow cylinder that rotates to load agricultural products/items into the receiving notch 262. In other embodiments, the agricultural products/items can be belt or other appropriate mechanisms.

The stator 210 and the rotor 220 are disposed near each other such that first and second surfaces 212, 222 are substantially opposed to each other. Because the second surface 222 tapers toward the first surface 212 along the circumferential second axis, the partially cylindrical space 230 has an inter-member distance 232 (see FIG. 8C) that decreases from a first end 240 to a second end 242 of the rotor 220. The decrease in the inter-member distance 232 corresponds to the increase in the height of the second surface 222. Accordingly, if an agricultural item/product is placed between the stator 210 and the rotor 220 at the first end 240 of the rotor 220 and moved toward the second end 242 of the rotor 220, the decreasing inter-member distance 232 (from 232A to 232B) generates an increasing compressive force on the agricultural item/product. One method of moving an agricultural item/product from the first end 240 to the second end 242 of the rotor 220 is to rotate at least one of the stator 210 and the rotor 220 relative to each other to roll the agricultural item/product. The embodiment depicted in FIGS. 8A-8H, the rotor 220 rotates counterclockwise within the partially cylindrical space 230 of the stator 210.

Figure 8D:
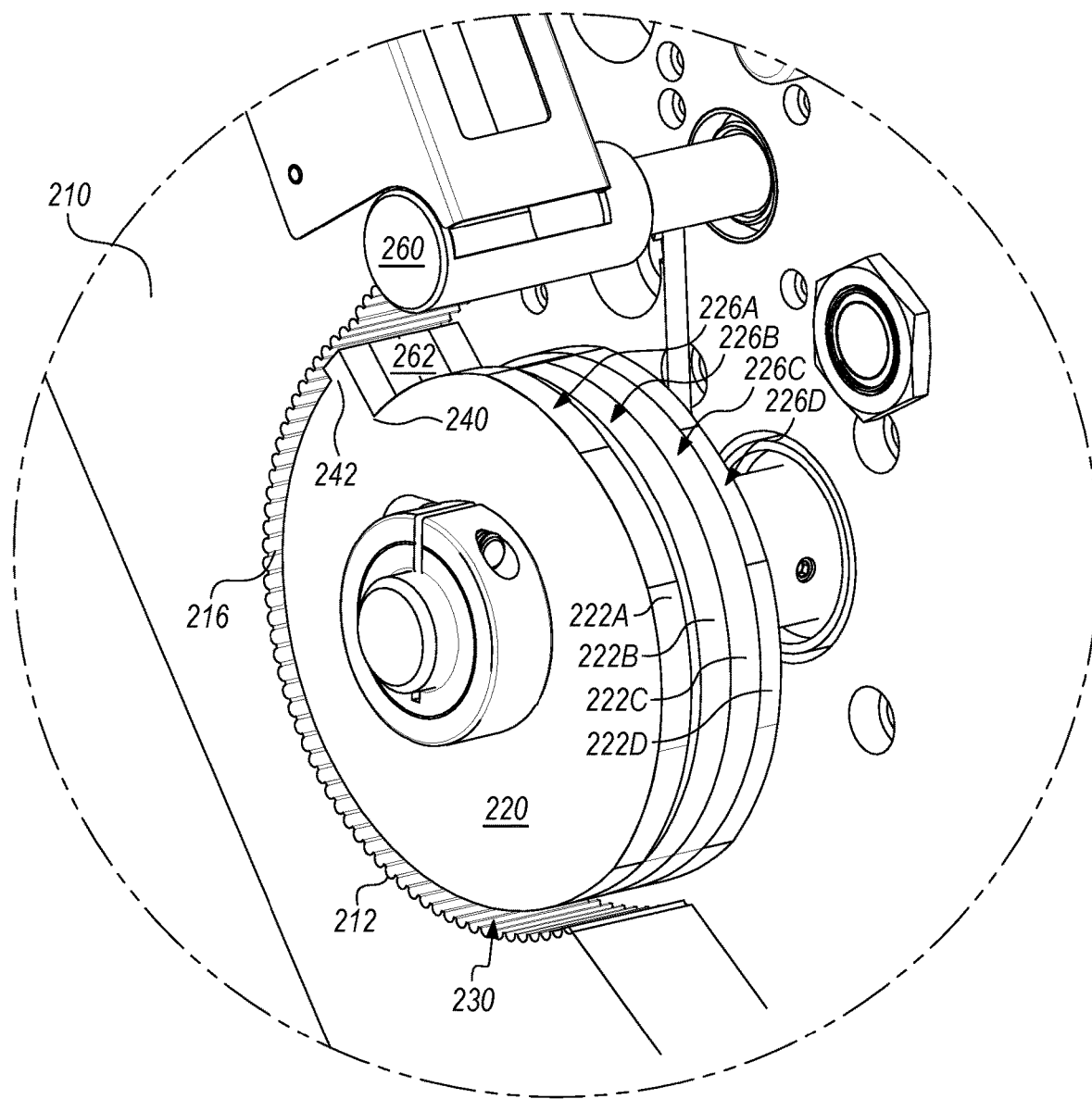
Figure 8E:
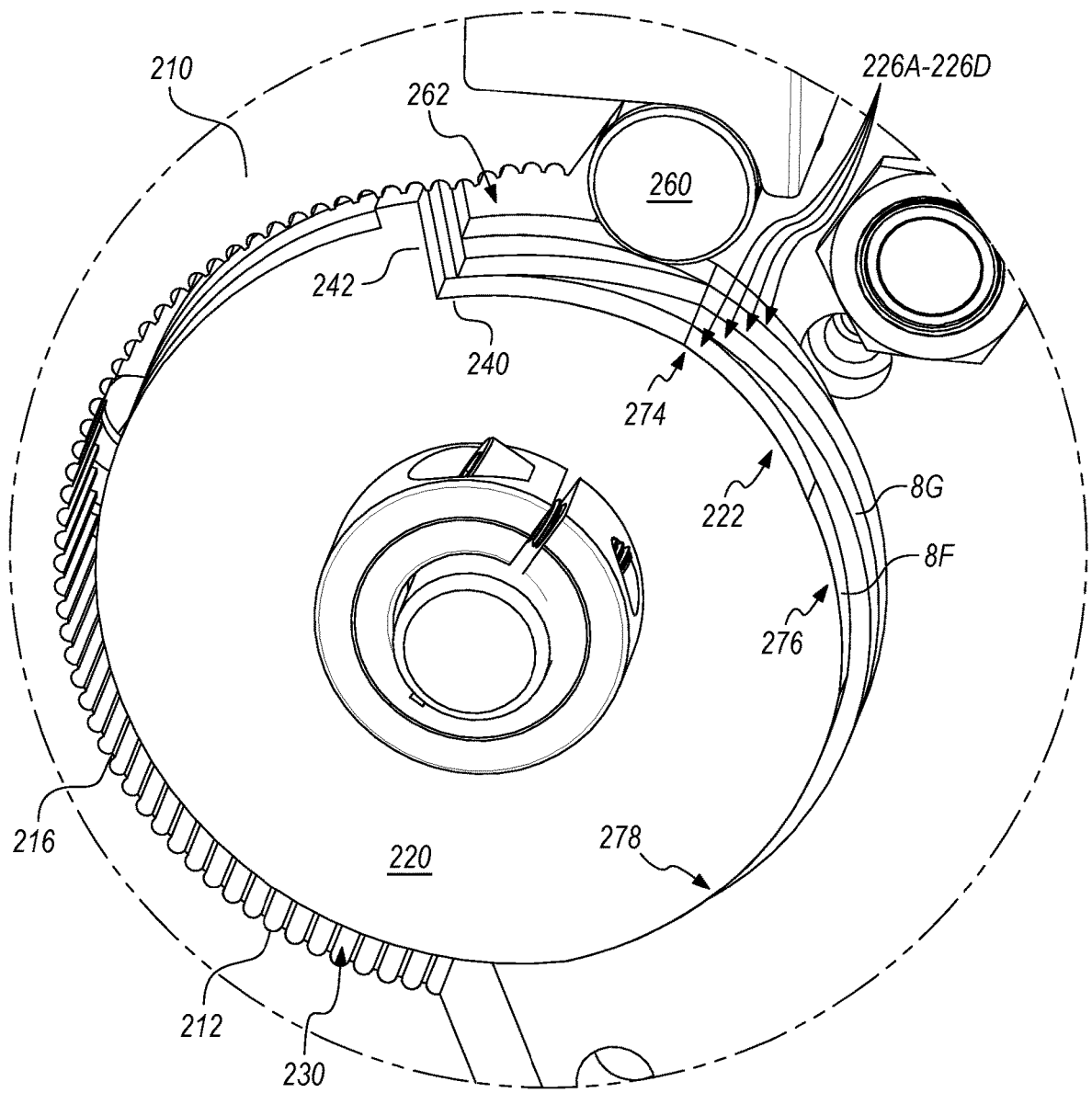

In addition to tapering from the first end 240 to the second end 242, the second surface 222 may also be contoured to apply a compression force to specific portion(s) of an agricultural item/product disposed between the stator 210 and the rotor 220 as the rotor 220 rotates within the stator 210. For instance, FIGS. 8D and 8E depict that the outer surfaces 222A-222D of the lamina 226A-226D change "heights" (in an orthogonal axis (not shown)) that is perpendicular to the circumferential second axis along the circumferential second axis, as described below. Cross-sectional views in FIGS. 8F and 8G (see FIG. 8E for positions of FIGS. 8F and 8G) depict the changes in heights of the outer surfaces 222A-222D of the lamina 226A-226D (in the orthogonal axis) along the circumferential second axis from the receiving notch 262.

Figure 8F:
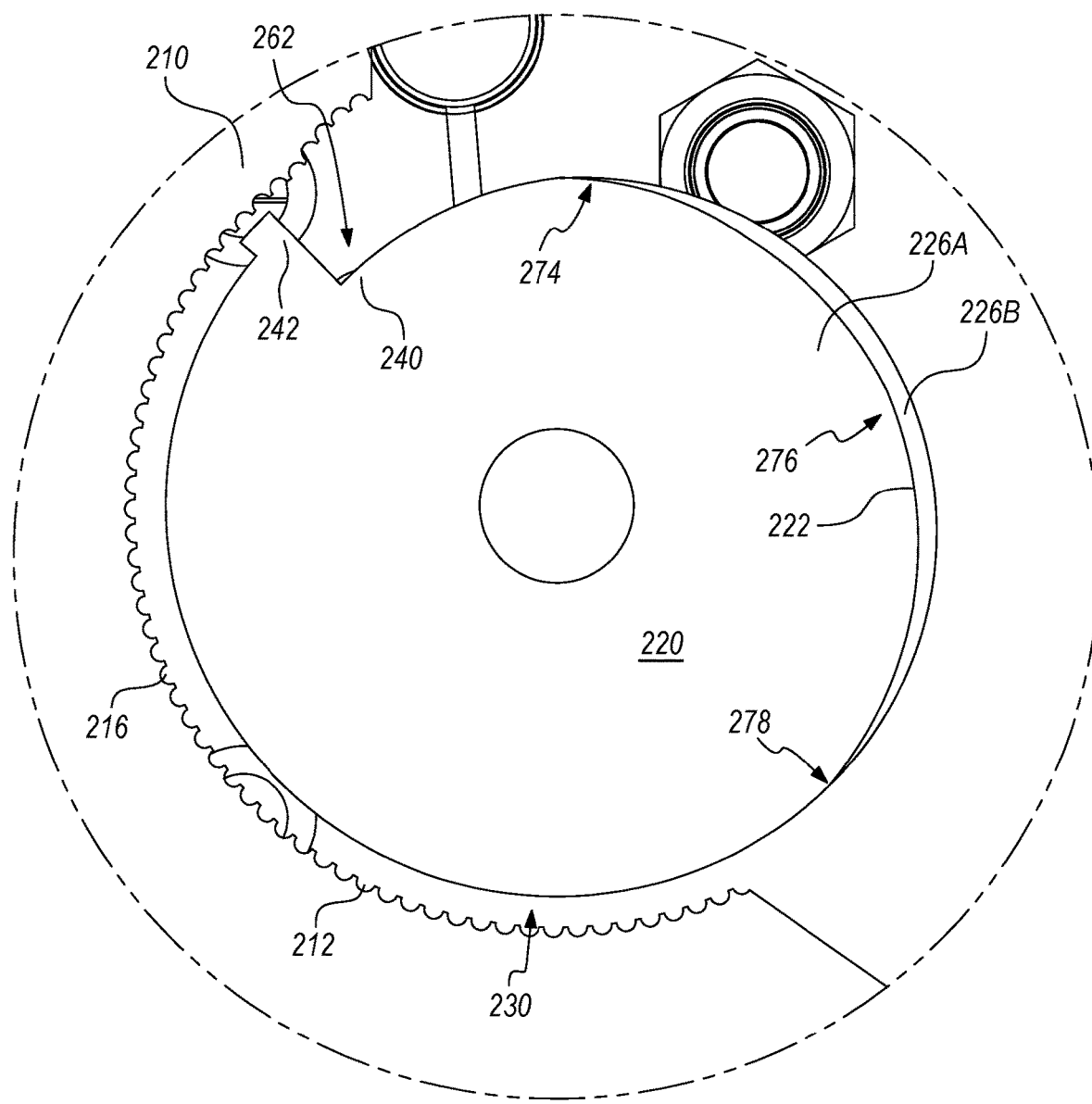
Figure 8G:
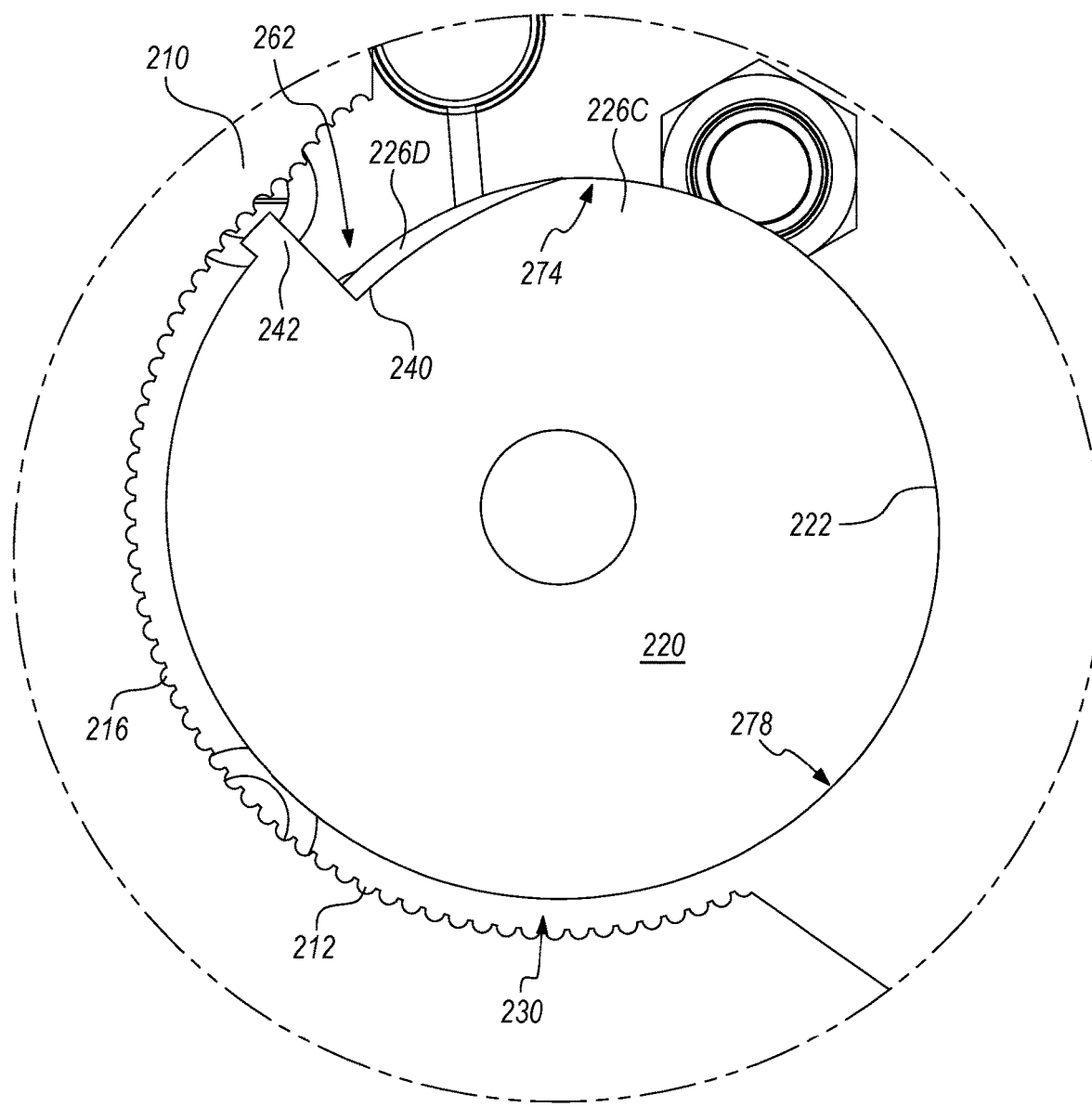

The teeth 216 on the first surface 212 of the stator 210, the outer surfaces 222A-222D of the lamina 226A-226D on the second surface 222 of the rotor 220, and the taper of the second surface 222 toward the first surface 212 combined to generate a progressive differential compression force on the agricultural item/product. As shown in FIG. 8E, after the agricultural item/product enters the cylindrical extraction system 200 at the receiving notch 262, a small compression force is applied to the agricultural item/product. Then, as the agricultural item/product is rotated around the partially cylindrical space 230 by counterclockwise rotation of the rotor 220, the compression force is gradually and progressively increased by the taper of the second surface 222 toward the first surface 212 along the circumferential second axis. As shown in FIGS. 8F and 8G, during rotation of the agricultural item/product around the partially cylindrical space 230, the compression force is moved first from opposite ends of the agricultural item/product to a middle-section/midline thereof (out to in), then from the middle-section/midline of the agricultural item/product toward opposite ends of the agricultural item/product (in to out). This configuration facilitates removal of vesicles from locules while minimizing vesicle breakage, which would increase the amount of uncontained acid in the final product, thereby reducing shelf-life. In fact, for some agricultural items/products (e.g., lime caviar) a metric of quality is related to the amount of uncontained acid in final product, which affects shelf-life).

The following describes the changes in height of the outer surfaces 222A-222D of the lamina 226A-226D (in the orthogonal axis) along the second circumferential axis. As shown in FIGS. 8D and 8E, the second member/rotor 220 is formed from a stack of four lamina/flanges 226. The two interior lamina 226B and 226C are identical to each other, and have identical outer surfaces 222B, 222C. Similarly, the two exterior lamina 226A, 226D are identical to each other and have identical outer surfaces 222A, 222D. The outer surfaces 222A-222D of the interior lamina 226B, 226C and exterior lamina 226A, 226D combined to form a second surface 222 with changing heights along an orthogonal axis perpendicular to the circumferential second axis.

When the rotor 220 (i.e., the lamina 226A-226D) and the stator 210 are configured and aligned as shown in FIGS. 8D and 8E, outer surfaces 222A-222D of the lamina 226A-226D, and the inner surface 212 of the stator 210 define space 230 with a changing cross-section configured to first release vesicles, then remove released vesicles from an agricultural item/product. As the rotor 220 rotates counter-clockwise relative to the stator 210, the cross-section of the space 230 changes in a predetermined sequence to manipulate the agricultural item/product therein (e.g., to extract vesicles while minimizing vesicle breakage).

The stator 210 and the rotor 220 define a receiving notch 262 to receive an agricultural item/product into the system 200. The receiving notch 262 is enlarged because the inner surface 212 of the stator 210 invaginates from the circumference of the partially cylindrical space 230. The enlarged receiving notch 262 facilitates loading of agricultural item/product and control of the position of the agricultural item/product by controlling the counter-clockwise rotation of the rotor 220 relative to the stator 210. The hollow cylindrical loading member 260 receives an approximately cylindrical agricultural item/product (e.g., a sliced finger lime) and rotates to load agricultural products/items into the receiving notch 262, where it rests in the enlarged receiving notch 262.

From the receiving notch 262 to a first position 274 (see FIGS. 8E and 8G) along the second circumferential axis, the exterior lamina 226A, 226D are higher than the interior lamina 226B, 226C, but the exterior lamina 226A, 226D are decreasing in height relative to the interior lamina 226B, 226C. The height differential between the exterior lamina 226A, 226D and the interior lamina 226B, 226C in this section of the rotor 220 is largest at the end of the receiving notch 262 circumferentially farthest from the first position 274. The height differential drops to about zero at the first position 274, where the heights of the exterior lamina 226A, 226D and the interior lamina 226B, 226C are approximately equal, because the height of the interior lamina 226B, 226C increases at a higher rate than the height of the exterior lamina 226A, 226D. This height differential results in more pressure being exerted on the exterior portions of an agricultural item/product while the agricultural item/product is in contact with the section of the rotor 220 between the receiving notch 262 and the first position 274. Note that pressure is also exerted on the exterior portions of the agricultural item/product during this phase of the extraction process as the absolute height of all four lamina 226A-226D are increasing (albeit at different rates) in this section of the rotor 220.

Figure 10A:
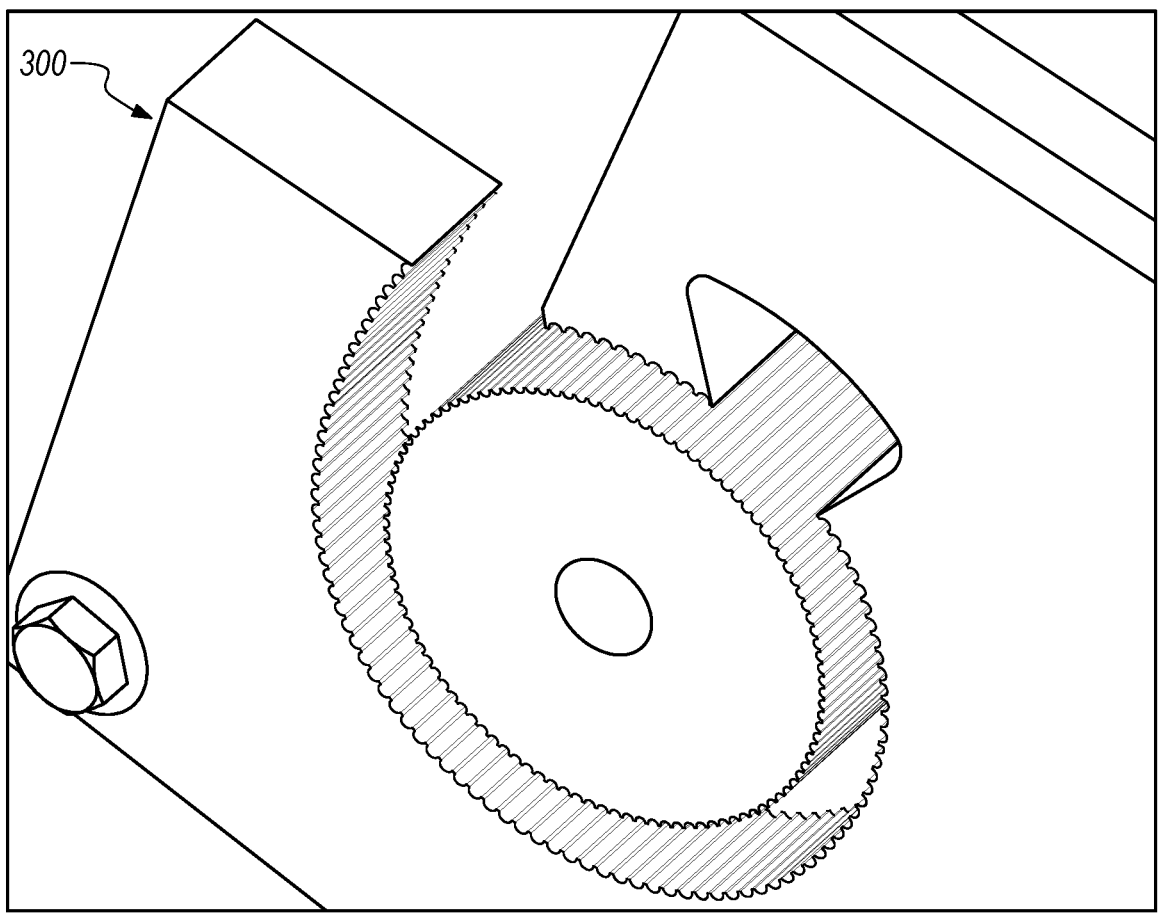
FIGS. 10A-10H illustrate a cylindrical extraction system for processing agricultural items according to one embodiment.
Figure 10B:
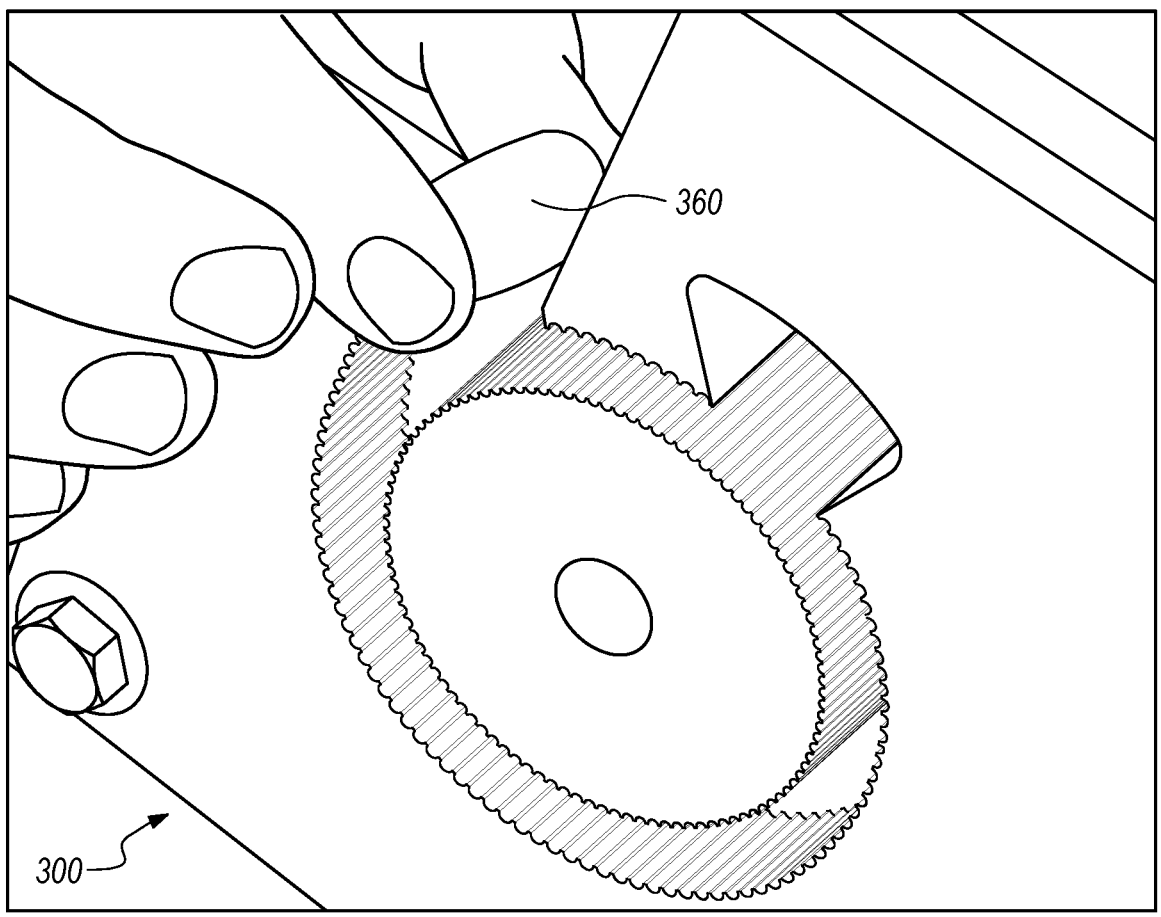
Figure 10C:
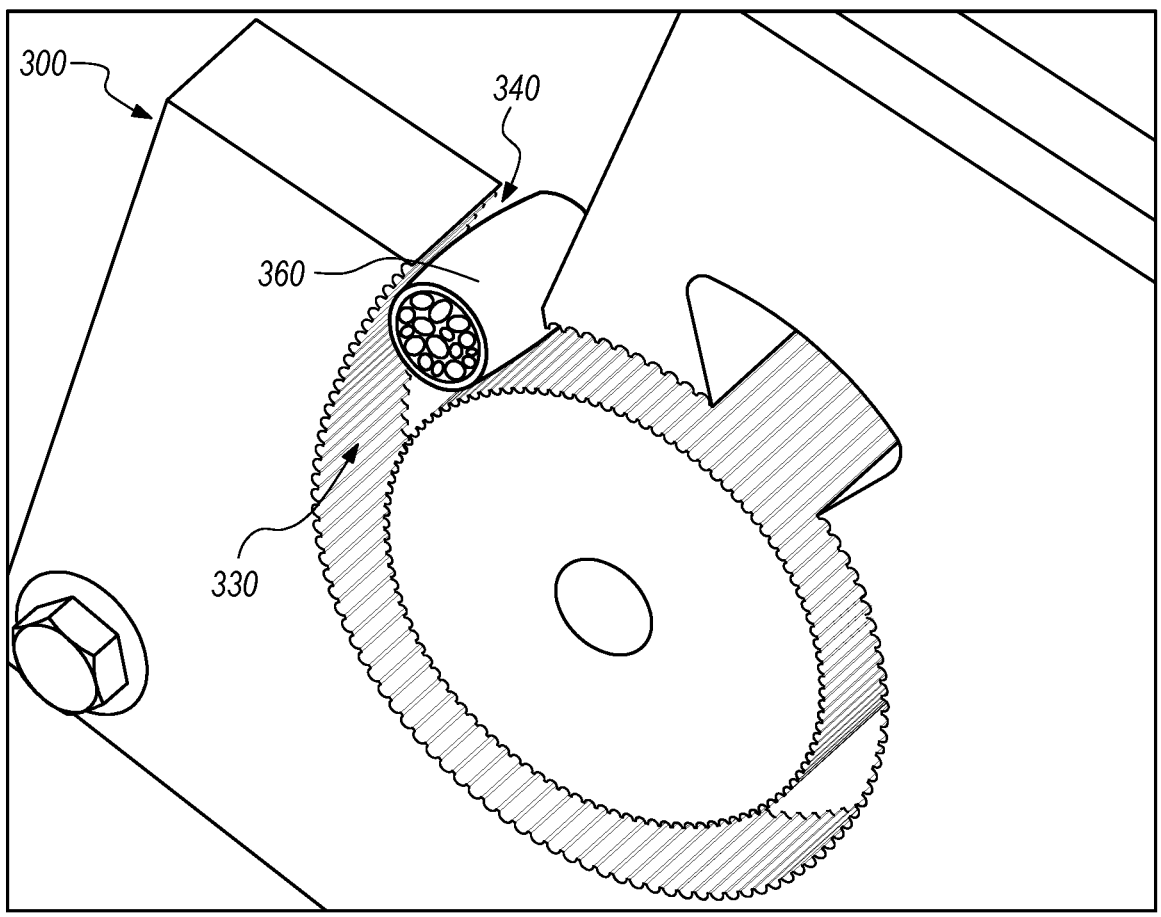

As the rotor 220 rotates counterclockwise, the agricultural item/product is moved along the first and second circumferential axes of the stator 210 and rotor 220, from the receiving notch 262 to the first position 274 (similar to FIGS. 10B and 10C). The pressure on the exterior portions of the agricultural item/product during this phase of the extraction process loosens the vesicles from the locules in the exterior portions of the agricultural item/product. The various portions of the extraction system 200 are configured to minimize vesicle breakage during this phase (and the other phases of) the extraction process.

From the first position 274 to a second position 276 (see FIGS. 8E and 8F) along the second circumferential axis, the interior lamina 226B, 226C are higher than the exterior lamina 226A, 226D, and increasing in relative height. From first position 274, where the heights of the exterior lamina 226A, 226D and the interior lamina 226B, 226C are approximately equal, the height of the interior lamina 226B, 226C increase at a faster rate than the height of the exterior lamina 226A, 226D to the second position 276, where the height differential in this section of the rotor 220 reaches a maximum. This height differential results in more pressure being exerted on the interior portions of the agricultural item/product while the agricultural item/product is in contact with the section of the rotor 220 between the first and second positions 274, 276. Note that pressure is also exerted on the exterior portions of the agricultural item/product during this phase of the extraction process as the absolute height of all four lamina 226A-226D are increasing (albeit at different rates) in this section of the rotor 220.

Figure 10D:
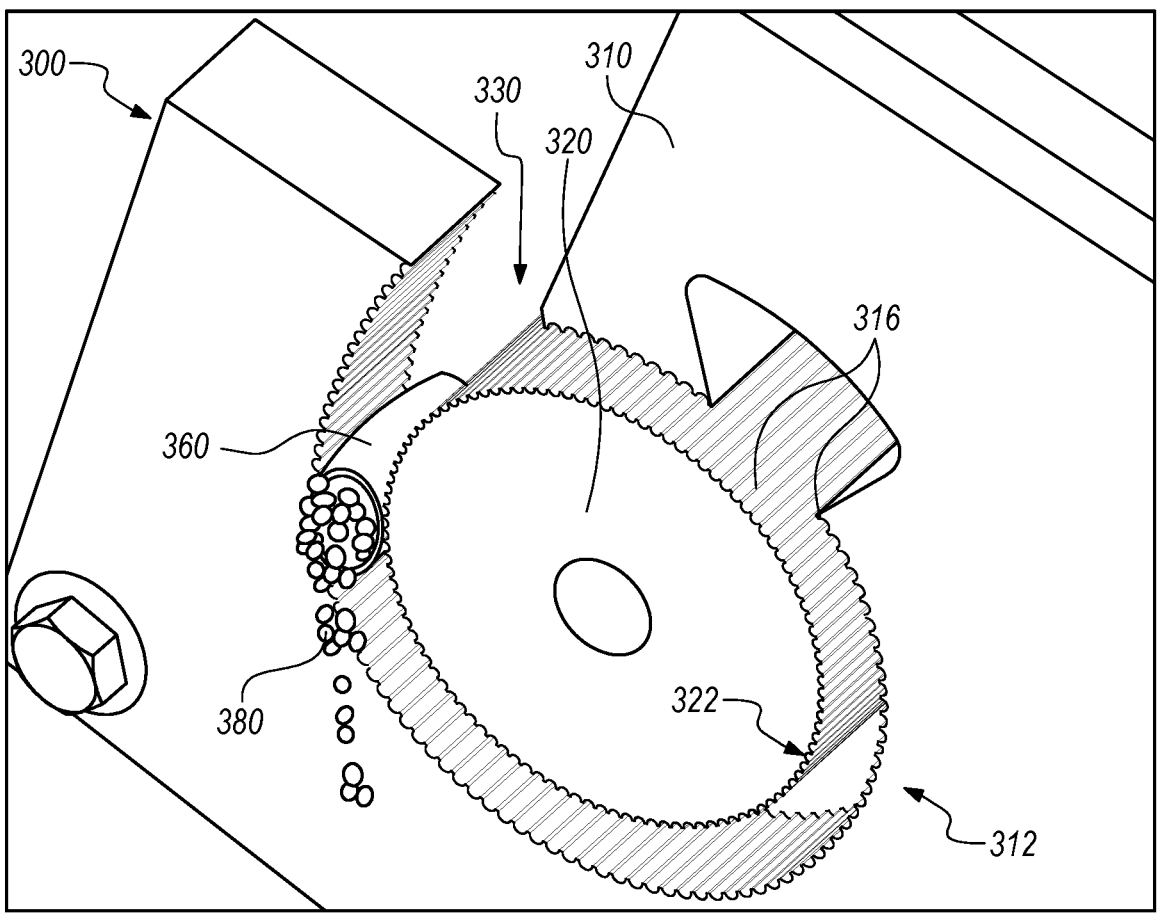

As the rotor 220 continues to rotate counterclockwise, the agricultural item/product is moved along the first and second circumferential axes of the stator 210 and rotor 220, from the first position 274 to the second position 276 (similar to FIGS. 10C and 10D). The pressure on the exterior portions of the agricultural item/product during this phase of the extraction process ejects some of the loosened vesicles (in two columns of loosened vesicles) from the open ends of the agricultural item/product (see FIG. 10D). As all of the lamina 226A-226D increase in height during this phase of the extraction process, more vesicles are loosened from the locules in the agricultural item/product. The agricultural item/product is also flattened from a round to an ovoid cross-section during this phase of the extraction process. The various portions of the extraction system 200 are configured to minimize vesicle breakage during this phase (and the other phases of) the extraction process.

From the second position 276 to a third position 278 (see FIGS. 8E and 8F) along the second circumferential axis, the interior lamina 226B, 226C are higher than the exterior lamina 226A, 226D, but decreasing in relative height. From second position 276, where the height differential in this section of the rotor 220 are at a maximum, the height of the exterior lamina 226A, 226D increase at a faster rate than the height of the interior lamina 226B, 226C to the third position 276, where the heights of the exterior lamina 226A, 226D and the interior lamina 226B, 226C are approximately equal. This height differential results in more pressure being exerted on the interior portions of the agricultural item/product while the agricultural item/product is in contact with the section of the rotor 220 between the second and third positions 276, 278. Note that pressure is also exerted on the exterior portions of the agricultural item/product during this phase of the extraction process as the absolute height of all four lamina 226A-226D are increasing (albeit at different rates) in this section of the rotor 220.

Figure 10E:
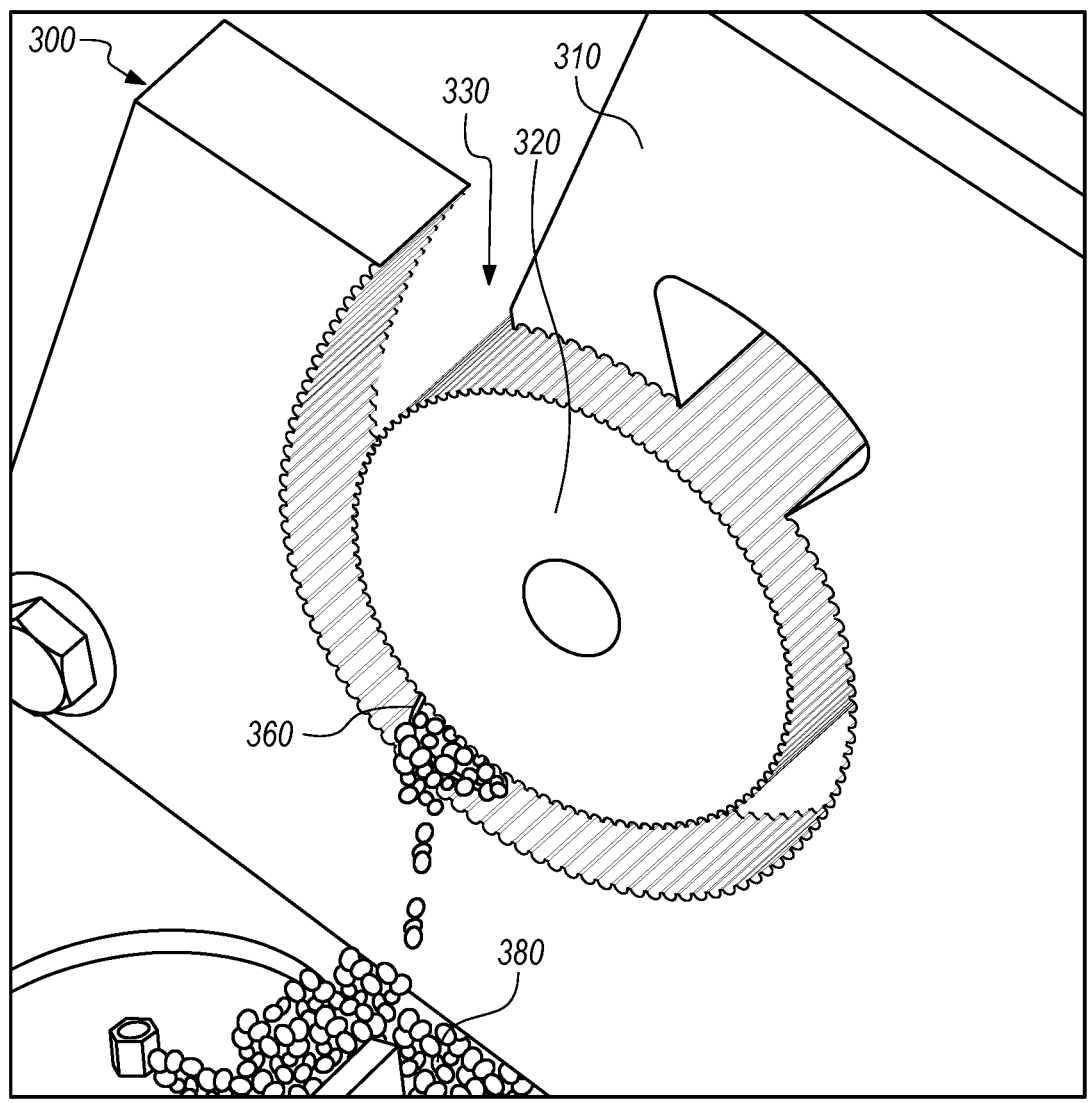

As the rotor 220 continues to rotate counterclockwise, the agricultural item/product is moved along the first and second circumferential axes of the stator 210 and rotor 220, from the second position 276 to the third position 278 (similar to FIGS. 10D and 10E). The pressure on both the interior and exterior portions of the agricultural item/product during this phase of the extraction process ejects more of the loosened vesicles (in two columns of loosened vesicles) from the open ends of the agricultural item/product (see FIG. 10E). As all of the lamina 226A-226D increase in height during this phase of the extraction process, more vesicles are loosened from the locules in the agricultural item/product. The agricultural item/product is also further flattened from an ovoid to an almost flat cross-section during this phase of the extraction process. The various portions of the extraction system 200 are configured to minimize vesicle breakage during this phase (and the other phases of) the extraction process.

From the third position 278 back to the receiving notch 262 (see FIGS. 8E-8G) along the second circumferential axis, the four lamina 226A-226D are the same height, and their heights increase at the same rate. Accordingly, the same increasing amount of pressure is exerted on the all portions along the length of the agricultural item/product while the agricultural item/product is in contact with the section of the rotor 220 between the third position 278 and the receiving notch 262.

Figure 10F:
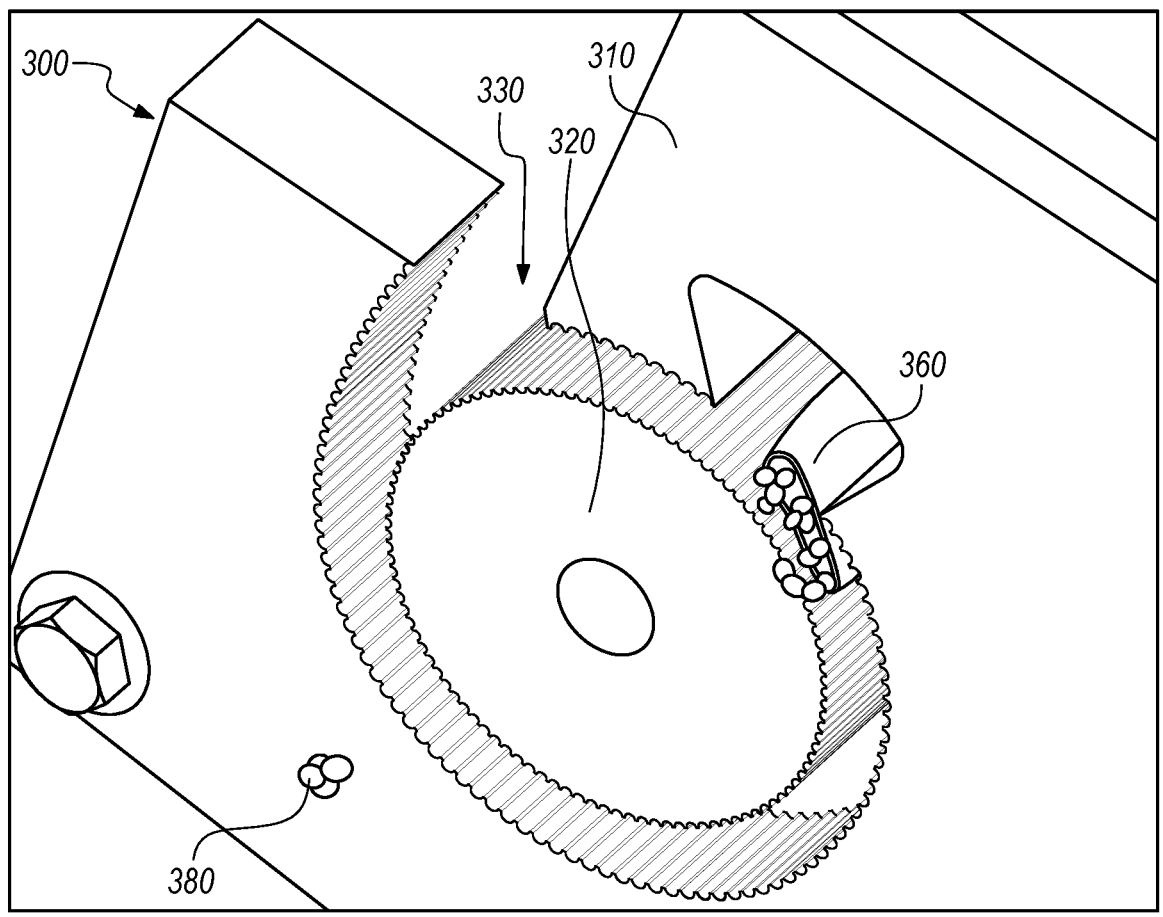

As the rotor 220 continues to rotate counterclockwise, the agricultural item/product is moved along the first and second circumferential axes of the stator 210 and rotor 220, from the third position 278 back to the receiving notch 262 (similar to FIGS. 10E and 10F). The pressure on both the interior and exterior portions of the agricultural item/product during this phase of the extraction process both loosens more vesicles and ejects more of the loosened vesicles (in two columns of loosened vesicles) from the open ends of the agricultural item/product (see FIG. 10E). The agricultural item/product is also further flattened from an almost flat to an even more flat cross-section during this phase of the extraction process. The various portions of the extraction system 200 are configured to minimize vesicle breakage during this phase (and the other phases of) the extraction process.

Figure 10G:
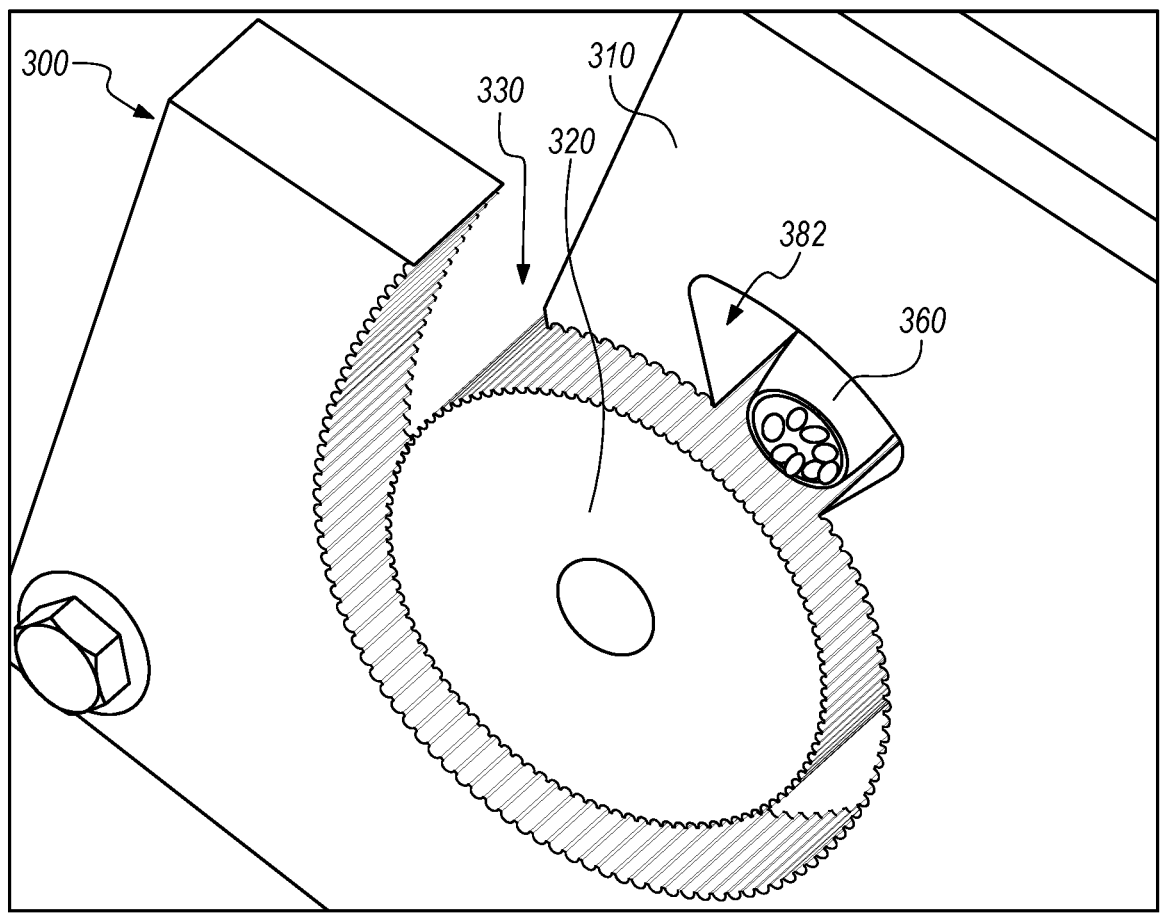
Figure 10H:
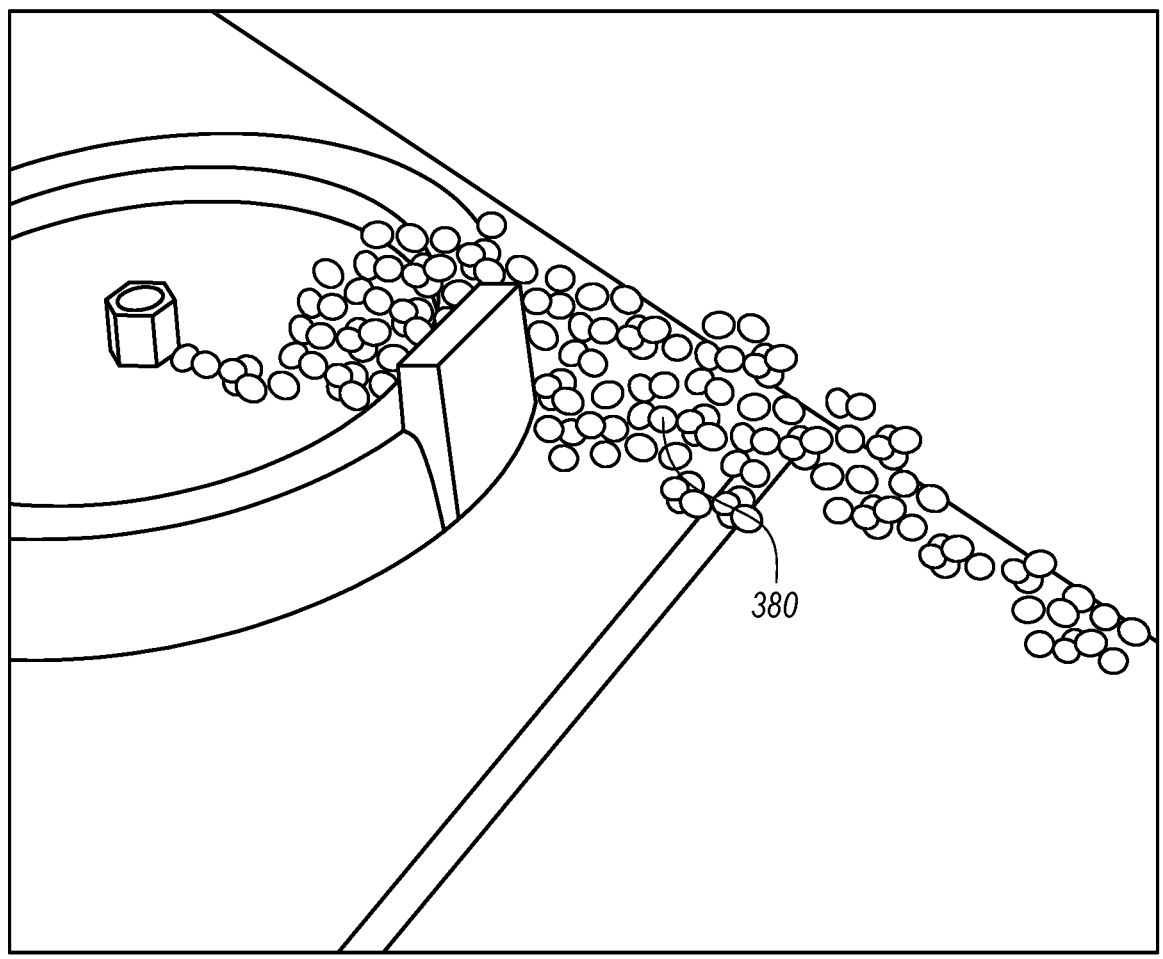

As shown in FIG. 10H, as the agricultural item/product is moved from the receiving notch 262 through the first, second and third positions 274, 276, 278, and back to the receiving notch 262, the phases of the extraction process depicted in FIGS. 10B to 10G retracts vesicles from the agricultural item/product while minimizing vesicle breakage. The changing relative heights of the four lamina 226A-226D moves the positions of the raised/higher portions of the outer surface 222 of the rotor 220 as it rotates counter-clockwise relative to the stator 210. In total, an approximately 270° counterclockwise rotation of the rotor 220 moves an agricultural items/product through approximately 180° of the stator 210 during the vesicle extraction process. Moving the agricultural items/product also rolls the agricultural items/product around a central axis, thereby applying compressive force from all sides of a substantially cylindrical agricultural items/product.

The system 200 depicted in FIGS. 8A-8H has four lamina 226A-226D (see 8C-8G), and is suitable to extract vesicles from agricultural items/products measuring about one inch in length. However, systems according to various embodiments may have fewer or more lamina. In particular, a system according to one embodiment has more and/or wider lamina to extract vesicles from agricultural items/products measuring up to about three inches in length.

Figure 8H:
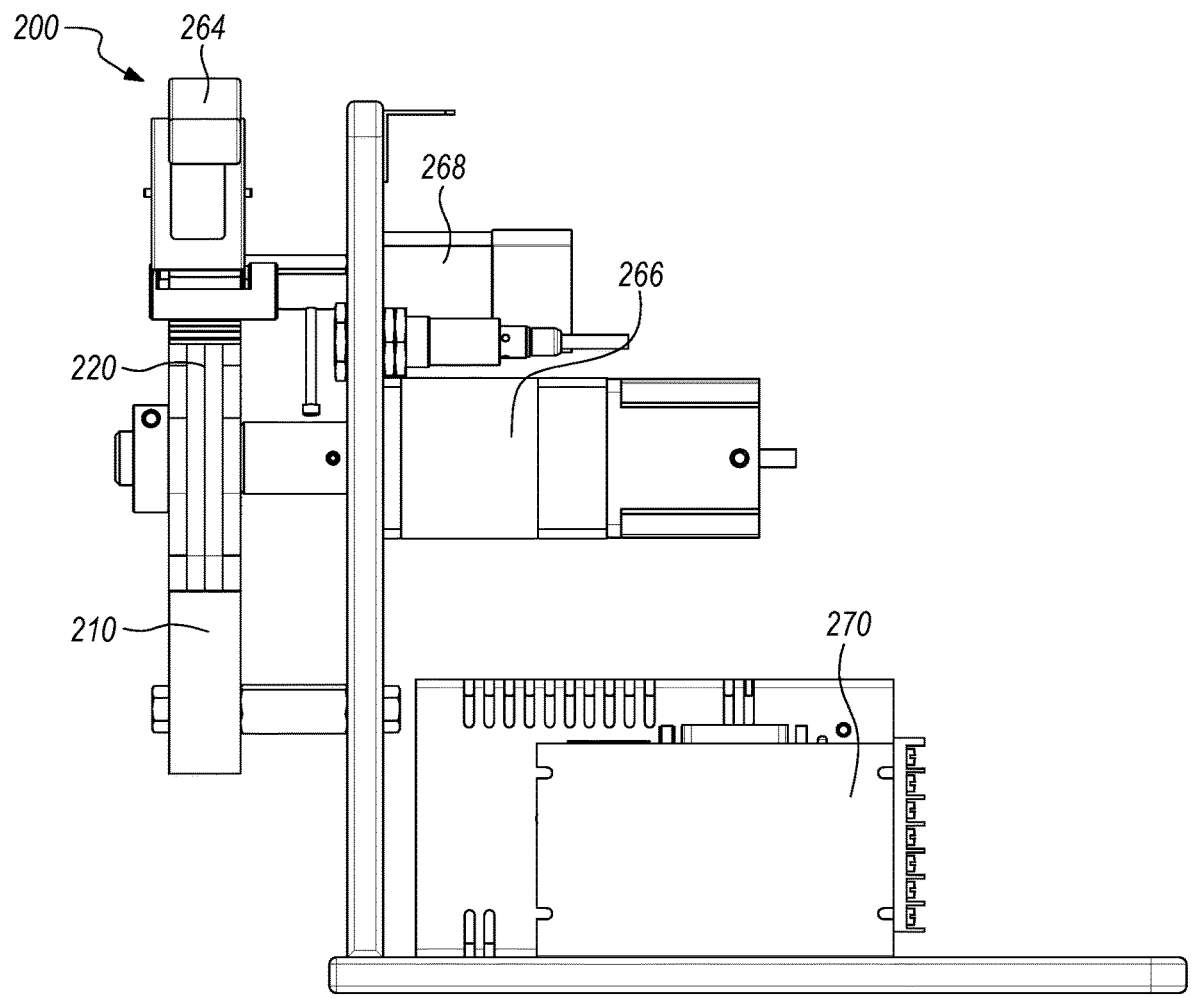
Figure 9:
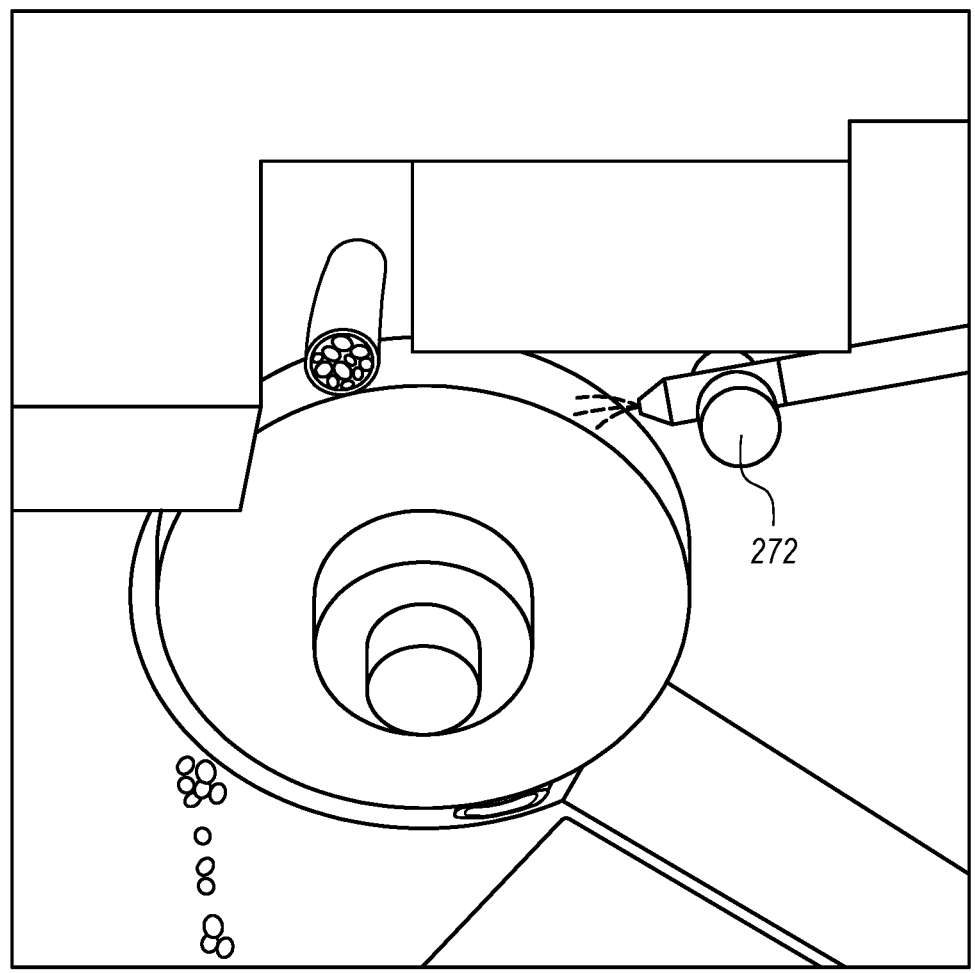
FIG. 9 illustrates a cylindrical extraction system for processing agricultural items according to one embodiment.

As shown in FIG. 8H, the cylindrical extraction system 200 also includes various other mechanical components to facilitate the vesicle extraction process. These mechanical components include, but are not limited to, a feeder 264, a second member rotary motor 266, a feeder motor 268, and an integrated circuit controller 270 to control the motors 266, 268. FIG. 9 depicts a cylindrical extraction system similar to the one depicted in FIGS. 8A-8H, including a washing fluid nozzle 272 to collect extracted vesicles using a flow of suitable fluid such as water. Other mechanical components may also include various sensors, receiving members, and ejectors (e.g., solenoid or air hose for removing processed rinds). In some embodiments, the substantially arcuate rotor 220 may be permanently coupled to the second member rotary motor 266 and the stator 210 may be removably coupled to the cylindrical extraction system 200. Such a design allows the stator 210 to be removed and exchanged for a different stator having a partially cylindrical space with a different radius to accommodate agricultural items/products of different sizes. In other embodiments, the rotor may be exchangeable to configure the cylindrical extraction system 200 for agricultural items/products of different sizes.

While the cylindrical extraction system 200 depicted in FIGS. 8A-8H has a substantially arcuate rotor 220 in a partially cylindrical space 230 in a stator 210, in other embodiments, the rotor may be substantially cylindrical (i.e., having a circular cross-section) and the space in the stator may be partially arcuate (i.e., having a cross-section defining a partial arc). FIGS. 10A-10H depict a vesicle extraction method using a cylindrical extraction system 300 according to one such embodiment in perspective views. FIG. 10A depicts the cylindrical extraction system 300 ready to receive an agricultural item/product. FIG. 10B depicts an agricultural item/product 360 being loaded into the cylindrical extraction system 300. The agricultural item/product 360 has been cut to a length similar to a thickness of the cylindrical extraction system 300. FIG. 10C depicts the agricultural item/product 360 sitting in the first end 340 (circumferentially) of the arcuate space 330 of the cylindrical extraction system 300.

FIG. 10D depicts the agricultural item/product 360 after it has been rotated about 25% of the way through the arcuate space 330 of the cylindrical extraction system 300. The teeth 316 on the first and second surfaces 312, 322 of the cylindrical extraction system 300 grab the agricultural item/product 360 as the cylindrical second member 320 is rotated within the first member 310. As the agricultural item/product 360 is compressed by the narrowing arcuate space 330 between the first and second members 310, 320, vesicles 380 are expelled from the open ends of the agricultural item/product 360. The first and/or second surfaces 312, 322 of the cylindrical extraction system 300 may have one or more raised/higher portions that may change positions on the first and/or second surfaces 312, 322 in a pre-determined manner (as described above) to change the pressure profile on the agricultural item/product 360.

FIG. 10E depicts the agricultural item/product 360 after it has been rotated about 50% of the way through the arcuate space 330 of the cylindrical extraction system 300. As the agricultural item/product 360 is further compressed by the narrowing arcuate space 330 between the first and second members 310, 320, more vesicles 380 are expelled from the open ends of the agricultural item/product 360. Further, the agricultural item/product 360 has been squeezed from a circular cross-section (FIG. 10D) to an ovoid cross-section (FIG. 10E).

FIG. 10F depicts the agricultural item/product 360 after it has been rotated about 95% of the way through the arcuate space 330 of the cylindrical extraction system 300. As the agricultural item/product 360 is further compressed by the narrowing arcuate space 330 between the first and second members 310, 312, even more vesicles 380 (only a few shown) are expelled from the open ends of the agricultural item/product 360. Further, the agricultural item/product 360 has been squeezed from an ovoid cross-section (FIG. 10E) to a flat cross-section (FIG. 10F).

FIG. 10G depicts the agricultural item/product 360 after it has been rotated completely through the arcuate space 330 of the cylindrical extraction system 300 and into a temporary storage space 382. Because the compressive force between the first and second members 310, 320 has been removed from the agricultural item/product 360, it has elastically recovered to an almost circular cross-section. FIG. 10H depicts the vesicles 380 removed from the agricultural item/product (not shown) by processing with the cylindrical extraction system (not shown).

Extraction Systems with Laminated Contoured Compression Surface

As shown in FIGS. 8D and 8E for example, the design of the second surface 222 of the second member 220 may incorporate a laminate structure made of a stack of lamina/flanges 226A-226D with each lamina/flange 226A-226D representing a stepwise approximation of the continuous compression contour. FIG. 8D shows an embodiment comprising four lamina (226) that impart various relative and absolute heights to the second surface 222 along an orthogonal axis perpendicular to the circumferential second axis.

In one embodiment, a system for extracting fruit vesicles includes: an assembly of a number of linear, individually contoured parallel compression flanges, each flange having a surface contour that engages the fruit in a rolling motion and imparts a programmed squeezing force profile to a portion of the fruit. The contours of the flanges are configured together to first impart a small compression to the endmost portion of the fruit by the end most flange thus mobilizing the endmost section of vesicles, followed by a second small compression to the adjacent portion of the fruit mobilizing those vesicles, etc. The flange structure is confugure to repeat the progression until vesicles along the entire length of the fruit have been mobilized; with the flange most distant from the cut surface contoured to complete the compression of the fruit. The system can then be reversed (either mechanically or structurally) to push the entire column of mobilized fruit vesicles toward the open end of the fruit, followed by the second most distant flange completing compression of the second most distant section and so on until the entire column of vesicles has been extracted from the fruit. The rate of compression of the contoured surfaces as a function of the number of rotations of the fruit may be optimized. The sequence of compression, decompression and final compression among the various flanges may be optimized as well.

In another embodiment, the extraction system is similar to the "stack of flanges" system described above. However, the system is embodied in a cylindrical extraction system, as described above relative to FIGS. 8A-10H. In such an embodiment, the second member is an assembly of approximately circular individually contoured compression flanges in which the fruit undergoes a programmed squeeze sequence as in the system described above. The cylindrical extraction system may process fruit in a continuous fashion in contrast to reciprocating linear systems that must include pauses for reversal of direction.

In still another embodiment, both linear and cylindrical extraction systems may be configured to extract fruit vesicles from both ends of the fruit by providing an assembly of flange with contours which are symmetrical with respect to a plane bisecting the axis of the fruit (and the second member). In this configuration, two identical outer flanges would provide the initial compression of the two outer edges of the fruit, followed by two identical flanges adjacent to the outer flanges providing the second compression, etc.

While the embodiments described herein include raised/higher portions on specific surfaces and members, similar raised/higher portions can be included on one or more of the first and second surfaces of the first and second members. While the embodiments described herein include motors and/or manual hand cranks, power to move the respective parts of the embodiments may be provided by any suitable means in any embodiment.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

Any of the devices described for carrying out the subject agricultural products processing procedures may be provided in packaged combination for use in such processing procedures. These supply "kits" may further include instructions for use and be packaged in containers as commonly employed for such purposes.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. For example, one with skill in the art will appreciate that one or more food grade lubricious coatings (e.g., oils and silicones) may be used in connection with various portions of the devices, such as relatively large interfacial surfaces of movably coupled parts, if desired, for example, to facilitate low friction manipulation or advancement of such objects relative to other portions of the instrumentation or nearby agricultural product structures. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A system for processing agricultural items, comprising:
   a first member having a first surface, a first axis, and a cylindrical space, the first surface being an inner surface of the cylindrical space; and
   a substantially arcuate second member having a contoured second surface and a second axis, the second member being disposed at least partially in the cylindrical space, and the contoured second surface being an outer surface of the second member,
   wherein the first surface and the second surface are substantially opposed to each other,
   wherein one of the first and second surfaces substantially tapers toward another of the first and second surfaces along the first or second axes,
   wherein the first and second axes are respective first and second circumferential axes, and
   wherein the contoured second surface includes a plurality of stacked, contoured, parallel compression flanges.

2. The system of claim 1, wherein the second surface includes first and second portions that change height relative to each other along at least a portion of the second axis.

3. The system of claim 1, wherein the first surface includes a plurality of teeth along at least a portion of the first axis.

4. The system of claim 3, wherein the plurality of teeth are uniform.

5. The system of claim 1, wherein the second surface is substantially symmetrical along the second axis.

6. The system of claim 1, wherein the first surface is substantially symmetrical along the first axis.

7. The system of claim 1, further comprising a motor operatively coupled to at least one of the first and second members to move the one of the first and second members relative to the other.

8. The system of claim 1, further comprising a feeder to introduce an agricultural item into a receiving notch in the second member.

9. The system of claim 1, further comprising an ejector for removing a processed agricultural item from the system.

10. The system of claim 1, wherein a first contoured, parallel compression flange of the plurality is configured to compress a first portion of an agricultural item.

11. The system of claim 10, wherein a second contoured, parallel compression flange of the plurality is configured to compress a second portion of the agricultural item adjacent the first portion.

12. The system of claim 1, wherein the plurality of stacked, contoured, parallel compression flanges comprises:
   a first symmetrical pair of contoured, parallel compression flanges configured to compress first and second portions of an agricultural item; and
   a second symmetrical pair of contoured, parallel compression flanges configured to compress third and fourth portions of the agricultural item respectively adjacent the first and second portions.

* * * * *